United States Patent
Matsunuma et al.

(10) Patent No.: US 6,602,621 B2
(45) Date of Patent: Aug. 5, 2003

(54) MAGNETIC RECORDING MEDIUM, METHOD FOR PRODUCING THE SAME, AND MAGNETIC STORAGE APPARATUS

(75) Inventors: Satoshi Matsunuma, Kamakura (JP); Akira Yano, Kitasouma-gun (JP); Tsuyoshi Onuma, Kitasouma-gun (JP); Takanobu Takayama, Toride (JP); Harumi Hieida, Kitasouma-gun (JP); Kouichirou Wakabayashi, Toride (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 10/026,636

(22) Filed: Dec. 27, 2001

(65) Prior Publication Data
US 2002/0122959 A1 Sep. 5, 2002

(30) Foreign Application Priority Data

Dec. 28, 2000 (JP) ........................... 2000-400471
Dec. 28, 2000 (JP) ........................... 2000-400476
Feb. 19, 2001 (JP) ........................... 2001-042568

(51) Int. Cl.$^7$ ................ G11B 5/66; G11B 5/70; C23C 14/32; B05D 5/12
(52) U.S. Cl. ............... 428/694 TS; 428/694 TM; 428/336; 428/611; 428/669; 428/900; 427/128; 427/131; 204/192.1; 204/192.2; 204/192.32
(58) Field of Search .................. 428/694 TS, 336, 428/694 TM, 900, 611, 669; 204/192.2, 192.1, 192.32; 427/128, 131; 360/97.01

(56) References Cited

U.S. PATENT DOCUMENTS 6,328,856 B1 * 12/2001 Brucker ................. 204/192.12
6,468,670 B1 * 10/2002 Ikeda et al. .............. 428/611

FOREIGN PATENT DOCUMENTS

| JP | 60-129922 A | * | 7/1985 |
| JP | A 60-129922 | | 7/1985 |
| JP | A-4-311809 | | 11/1992 |
| JP | A-5-282650 | | 10/1993 |
| JP | A-7-73429 | | 3/1995 |
| JP | A 8-30951 | | 2/1996 |
| JP | B2 2727582 | | 12/1997 |
| JP | A 11-339241 | | 12/1999 |
| JP | 2001-155329 A | * | 6/2001 |
| JP | A 2001-155329 | | 6/2001 |
| JP | A 2001-250218 | | 9/2001 |

* cited by examiner

Primary Examiner—Holly Rickman
(74) Attorney, Agent, or Firm—Oliff & Berridge, PLC

(57) ABSTRACT

A magnetic recording medium comprises, on a substrate, a soft magnetic layer, a first seed layer, a second seed layer, and a recording layer having an artificial lattice structure. The first seed layer contains oxide of Fe. The second seed layer contains one of Pd and Pt, Si, and N. The magnetic exchange coupling force in the in-plane direction of the recording layer is weakened by the first seed layer and the second seed layer. Accordingly, minute recording magnetic domains can be formed in the recording layer, and the magnetization transition area is distinct as well. Even when information is recorded at a high density, the information can be reproduced with low noise. A magnetic storage apparatus, which is provided with such a magnetic recording medium, makes it possible to achieve an areal recording density of 150 gigabits/square inch.

14 Claims, 11 Drawing Sheets

|  | S/Nd (dB) | Re(%) | Thermal decay ratio (%/decade) |
|---|---|---|---|
| Example 1 | 15.3 | 20.8 | 0 |
| Example 2 | 15.2 | 19.8 | 0 |
| Example 3 | 14.9 | 18.6 | 0 |
| Comparative Example 1 | 9.8 | 8.5 | −5.2 |
| Comparative Example 2 | 8.2 | 7.2 | −6.4 |

(a)　　　　　　　　　(b)

Fig. 8
(a)
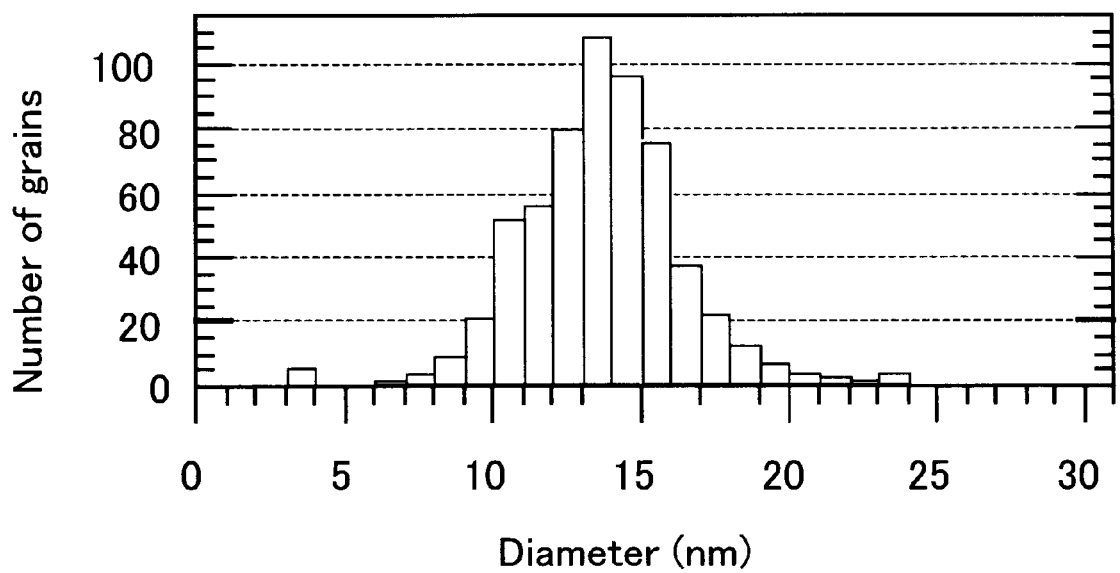
(b)
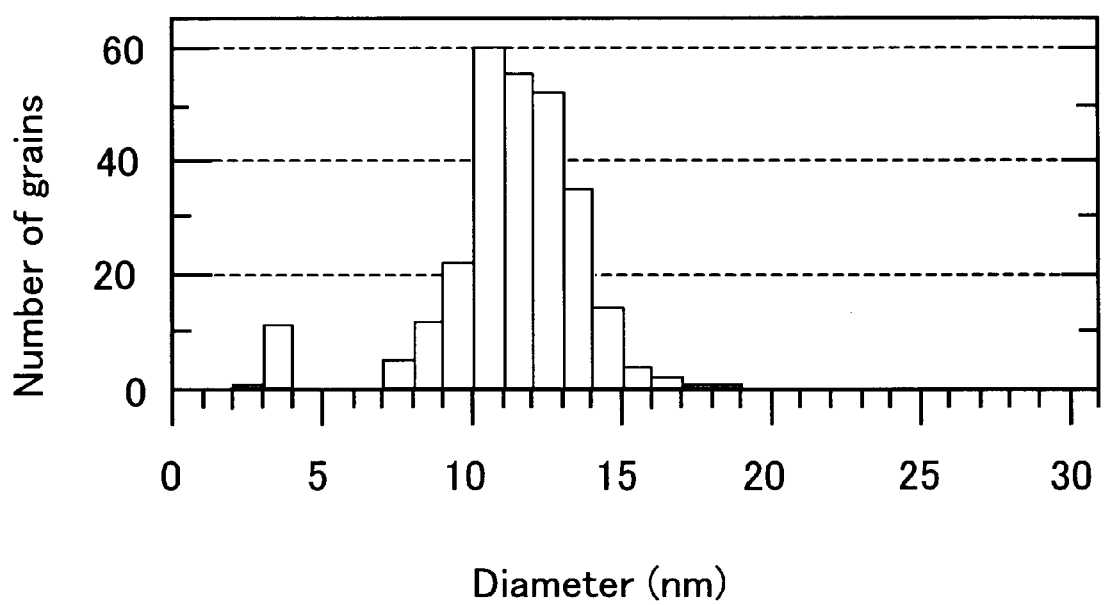

| | LFop/Nd (dB) | D50 (kFCI) | Soft magnetic layer | Method for forming seed layer | Film thickness of seed layer (nm) | Recording layer |
|---|---|---|---|---|---|---|
| Example 10 | 22.9 | 186 | FeTaC | reactive sputtering | 5 | Co/Pd |
| Example 11 | 23.5 | 182 | FeTaC | high temperature oxidation | 5 | Co/Pd |
| Example 12 | 23.1 | 183 | CoZrTa | reactive sputtering | 5 | Co/Pd |
| Example 13 | 21.1 | 190 | FeTaC | reactive sputtering | 5 | Co/Pt |
| Example 14 | 21.7 | 160 | FeTaC | reactive sputtering | 30 | Co/Pd |
| Comparative Example 4 | 18.3 | 190 | FeTaC | — | 0 | Co/Pd |
| Comparative Example 5 | 18.6 | 187 | FeTaC | — | 0 | Co/Pd |
| Comparative Example 6 | 15.8 | 192 | CoZrTa | — | 0 | Co/Pt |
| Comparative Example 7 | 10.0 | 197 | absent | reactive sputtering | 0 | Co/Pd |
| Reference Example 1 | 20.9 | 160 | FeTaC | reactive sputtering | 40 | Co/Pd |
| Reference Example 2 | 20.0 | 155 | FeTaC | reactive sputtering | 50 | Co/Pd |

Fig. 14

| | LFop/Nd (dB) | D50 (kFCI) | Fe_Met/Fe_Oxi of seed layer (atom number ratio) | Film formation condition for seed layer | | Sputtering etching for seed layer surface | Recording layer |
|---|---|---|---|---|---|---|---|
| | | | | Flow rate ratio of $O_2$ with respect to Ar (%) | Thickness (nm) | | |
| Example 15 | 25.2 | 188 | 0.03 | 6 | 5 | absent | Co/Pd |
| Example 16 | 24.8 | 190 | 0.18 | 2.5 | 5 | absent | Co/Pd |
| Example 17 | 24.9 | 187 | 0.04 | 6 | 5 | absent | Co/Pt |
| Example 18 | 27.1 | 185 | 0.03 | 6 | 5 | present | Co/Pd |
| Example 19 | 22.8 | 189 | 0.02 | 8 | 5 | absent | Co/Pd |
| Example 20 | 15.7 | 192 | 0.22 | 1.5 | 5 | absent | Co/Pd |
| Example 21 | 23.0 | 144 | 0.03 | 5 | 30 | absent | Co/Pd |
| Example 22 | 21.5 | 187 | 0.01 | 8 | 5 | absent | Co/Pt |
| Example 23 | 14.8 | 197 | 0.21 | 1.5 | 5 | absent | Co/Pt |

MAGNETIC RECORDING MEDIUM, METHOD FOR PRODUCING THE SAME, AND MAGNETIC STORAGE APPARATUS

BACKGROUND OF THE INVENTION

1. Field of the Invention

The present invention relates to a magnetic recording medium, a method for producing the same, and a magnetic storage apparatus. In particular, the present invention relates to a magnetic recording medium of the type in which a head makes contact therewith temporarily or steadily, such as in the case of a hard disk or a floppy disk. The present invention also relates to a method for producing the magnetic recording medium, and a magnetic storage apparatus.

2. Related Art

In response to the development of the advanced information society in recent years, there is a steady increase in need for the realization of high capacity and high density of the information-recording apparatus. A magnetic storage apparatus is known as one of information-recording apparatuses to respond to the need as described above. The magnetic storage apparatus is used as a large capacity storage unit, for example, for large servers, parallel-connected type computers, personal computers, network servers, movie servers, and mobile PC's. The magnetic storage apparatus comprises a magnetic recording medium on which information is recorded, and a magnetic head which is used to record and reproduce information on the magnetic recording medium. The magnetic recording medium includes a ferromagnetic thin film composed of cobalt alloy or the like which is formed as a recording layer on a disk-shaped substrate, for example, by means of the sputtering method. A protective film and a lubricant film are formed on the recording layer in order to enhance the resistance to sliding movement and the corrosion resistance.

In association with the realization of the high capacity of the magnetic storage apparatus, the improvement in recording density of the magnetic recording medium is advanced on the basis of the recording of fine and minute recording magnetic domains in the recording layer of the magnetic recording medium. The perpendicular magnetic recording system attracts attention as a method for finely recording the recording magnetic domains. In the perpendicular magnetic recording system, the magnetic recording is performed by forming magnetic domains having perpendicular magnetization in the recording layer by using the magnetic recording medium having the recording layer which exhibits perpendicular magnetization. In the perpendicular magnetic recording system as described above, the minute magnetic domains can be formed in the recording layer. Therefore, it is possible to increase the recording density of the magnetic recording medium.

A polycrystal film based on the Co—Cr system has been hitherto used as a material for the recording layer of the magnetic recording medium in accordance with the perpendicular magnetic recording system as described above. The polycrystal film has a structure in which a Co-rich area having ferromagnetism and a non-magnetic Cr-rich area are separated from each other. The magnetic interaction, which may be exerted between the adjacent ferromagnetic areas, is blocked by the non-magnetic area. Accordingly, the high density and the low noise are realized.

In order to efficiently apply the magnetic field from the magnetic head to the recording layer in the perpendicular magnetic recording system, a magnetic recording medium provided with two layers of magnetic films has been suggested, in which a soft magnetic layer composed of a soft magnetic material and a recording layer composed of a hard magnetic material for recording information are combined.

In order to further improve the areal recording density of the magnetic recording medium, it is necessary to reduce the medium noise. It has been revealed that the development of fine unit of inversion of magnetization (or recorded bits) and the development of high sensitivity of the reading head are effective for this purpose. Especially, it has been revealed that the size of the magnetic crystal grain may be made fine in order to realize the fine unit of inversion of magnetization. However, if the magnetic crystal grain is made too fine, the so-called thermal fluctuation is caused, in which the magnetization state of the magnetic crystal grain is thermally unstable. In order to avoid such an inconvenience, for example, Japanese Laid-Open Patent Publication No. 8-30951 discloses a magnetic recording medium comprising a soft magnetic layer, a first intermediate layer composed of carbon, a second intermediate layer, and a recording film having an artificial lattice structure which are stacked in this order on a non-magnetic substrate.

A magnetic layer, which has magnetic anisotropy higher than that of the polycrystal film based on the Co—Cr system as described above and which is excellent in resistance to the thermal fluctuation, has been progressively studied as a recording layer for the magnetic recording medium. Those known as such a magnetic layer include, for example, an artificial lattice multilayered film (also referred to as "alternately stacked multilayered film") in which Co and Pd or Co and Pt are alternately stacked, and a ordered alloy film which is obtained by thermally treating an alloy film of, for example, Fe and Pt or Co and Pt at a high temperature. The artificial lattice multilayered film and the ordered alloy film are expected to have high resistance to the thermal fluctuation, because such films have high magnetic anisotropy.

However, such a film has the following drawback unlike the polycrystal film based on the Co—Cr system, because the magnetic interaction is strong in the in-plane direction (direction parallel to the surface of the substrate). That is, it is impossible to form small magnetic domains, and the transition medium noise is large. In the case of the magnetic recording medium disclosed in Japanese Laid-Open Patent Publication No. 8-30951 described above, the second intermediate layer composed of Pt or Pd is provided on the first intermediate layer composed of carbon formed on the soft magnetic layer, and the artificial lattice film of Co/Pt or Co/Pd is formed thereon. Accordingly, the crystal orientation of the artificial lattice film is improved, the perpendicular magnetic anisotropy is enhanced, and thus the coercivity is improved. However, in the case of such a magnetic recording medium, the magnetic exchange coupling force in the in-plane direction of the recording layer is strengthened, and the transition noise, which appears as the jitter when the linear recording density is increased, is increased. As a result, it has been difficult to perform recording and reproduction at a high recording density. Further, the following problem also arises. That is, the writing magnetic field supplied from the magnetic head does not arrive at the soft magnetic layer effectively, and the saturation recording characteristics are inferior, because the two intermediate layers, i.e., the first intermediate layer and the second intermediate layer are used.

Japanese Patent No. 2727582 discloses a perpendicularly magnetizable film comprising an artificial lattice film of Co-Pt stacked on an underlying base film composed of composite oxide based on any oxide of Fe, Co, and Ni or an arbitrary combination thereof, as a perpendicular magnetic recording film which is excellent in practical characteristics such as corrosion resistance and durability and which is excellent in perpendicular magnetization characteristics and magneto-optical characteristics.

The present invention has been made in order to solve the problems involved in the conventional technique as described above, an object of which is to provide a magnetic recording medium and a method for producing the same, in which the magnetic exchange coupling force in the in-plane direction of a magnetic layer is low, the transition noise is reduced, and information can be reproduced at high S/N.

Another object of the present invention is to provide a magnetic recording apparatus provided with excellent thermal fluctuation resistance characteristics in which information can be reproduced at high S/N even when the information is recorded at a high areal recording density.

SUMMARY OF THE INVENTION

According to a first aspect of the present invention, there is provided a magnetic recording medium comprising:

a substrate;

a soft magnetic layer;

a first seed layer containing oxide of Fe;

a second seed layer containing one of Pd and Pt, Si, and N; and a recording layer.

The magnetic recording medium according to the first aspect of the present invention comprises, as the underlying base for the recording layer, the second seed layer containing one of Pd and Pt, Si, and N. The magnetic recording medium further comprises, as the underlying base for the second seed layer, the first seed layer containing Fe oxide or oxide of Fe. For example, when the recording layer is constructed with an artificial lattice film composed of a platinum group metal and Co, the first seed layer and the second seed layer as described above make it possible to optimally control the crystalline orientation of the artificial lattice film and the magnetic exchange coupling force of crystal grains.

According to studies performed by the present inventors, when the second seed layer was formed of, for example, only Pd crystals, then the size of the recording magnetic domain formed in the recording layer was increased, and it was impossible to form any fine and minute recording magnetic domain, probably for the following reason. That is, if the second seed layer is formed of only Pd crystals, then a recording layer having an artificial lattice structure, in which the grain boundary is indistinct, is formed on the second seed layer, and the magnetic exchange coupling force in the in-plane direction, which is exerted between crystal grains of the recording layer, is strengthened. The present inventors have found out that it is possible to form fine and minute magnetic domains in the recording layer, and it is possible to reduce the noise as well, by constructing the second seed layer with one of Pd and Pt, Si, and N, probably for the following reason.

It is considered that when the second seed layer is constructed with one of Pd and Pt, Si, and N, Pd or Pt exists in a dispersed manner as a microcrystalline or partially amorphous structure in SiN (or in SiN network structure). Further, the dispersion of Pd or Pt in SiN in the second seed layer as described above is facilitated in an advanced manner in accordance with the principle as described later on, owing to the fact that the first seed layer containing Fe oxide is used as the underlying base. It is considered that the artificial lattice film having the distinct grain boundary is formed on the second seed layer, because the recording layer, which has the artificial lattice structure formed on the second seed layer, is grown with nucleuses of dispersed Pd or Pt. Therefore, the magnetic exchange coupling force in the in-plane direction, which is exerted between the crystal grains of the recording layer having the artificial lattice structure, is reduced, and thus the transition noise is reduced. Especially, the trace amount of N in the second seed layer can further accelerate the dispersion of Pd or Pt as a result of binding to Si. Therefore, it is possible to further weaken the magnetic exchange coupling force in the in-plane direction of the recording layer. Accordingly, it is possible to further reduce the transition noise.

The reason why the dispersion of Pd or Pt in SiN in the second seed layer is further facilitated by using the first seed layer containing the Fe oxide as the underlying base for the second seed layer will now be explained.

According to the knowledge of the present inventors, Pd or Pt, which is the metal element of the elements for constructing the second seed layer, has low wettability with respect to the Fe oxide for constructing the first seed layer. For this reason, it is considered that when the second seed layer containing Pd or Pt is formed on the first seed layer containing the Fe oxide, Pd or Pt, which has the low wettability with respect to the Fe oxide, is formed in a further dispersed manner on the layer of the Fe oxide in accordance with the surface tension. Accordingly, it is considered that the dispersion is further accelerated for Pd or Pt existing in the microcrystalline or partially amorphous structure in SiN (or SiN network structure). As described above, when the second seed layer, which contains one of Pd and Pt, Si, and N, is formed on the first seed layer containing the Fe oxide, and the recording layer is formed on the second seed layer, then the aggregates of extremely fine crystal grains are formed in the recording layer in accordance with the principle described above. It is possible to form minute magnetic domains in the recording layer constructed by the aggregates of fine crystal grains. Further, the magnetization transition area is extremely distinct as well. Therefore, it is possible to reduce the noise as compared with the conventional technique.

In the magnetic recording medium according to the first aspect of the present invention, the contents of Si and N in the second seed layer are desirably as follows. That is, the content of Si is desirably within a range of 10 atomic % to 35 atomic %, and more desirably 20 atomic % to 30 atomic %. The content of N is desirably within a range of 0.1 atomic % to 5 atomic %, and more desirably 0.5 atomic % to 5 atomic %. When the contents of Si and N in the second seed layer are controlled to be within the ranges as described above, it is possible to optimize the crystalline orientation of the recording layer and the magnetic exchange coupling force in the in-plane direction. Accordingly, it is possible to reliably form the fine and minute recording magnetic domains in the recording layer, and the magnetization transition area is distinct as well. Thus, it is possible to reduce the noise. That is, it is possible to realize the reduction of the noise and the improvement of the resolution. The second seed layer may further contain a trace amount of Co. In this case, it is preferable that the content of Co is within a range of 1 atomic % to 10 atomic %, while the contents of Si and N in the second seed layer satisfy the ranges described above. It is preferable that the second seed layer has a microcrystalline structure or a structure in which amorphous matters partially exist in a microcrystalline structure.

In the magnetic recording medium according to the first aspect of the present invention, it is preferable that the first seed layer contains Fe existing as metal (hereinafter referred to as "Fe metal") in addition to the Fe oxide. The magnetic recording medium provided with the seed layer as described above makes it possible to further reduce the medium noise. The reason therefor will be explained below.

The first seed layer, which contains the Fe metal in addition to the Fe oxide, is considered to be in a state in which extremely minute Fe metal particles are dispersed in the Fe oxide. As described above, the Fe oxide has the low wettability with respect to Pd or Pt, for example, for constructing the second seed layer. On the other hand, the Fe metal has the high wettability with respect to Pd or Pt. For this reason, when Pd or Pt is accumulated on the first seed layer in which the Fe metal particles are dispersed in the Fe oxide, Pd or Pt selectively adsorbs to the Fe metal. In this situation, the Fe metal in the first seed layer is extremely minute. Therefore, Pd or Pt, which has adsorbed to the Fe metal, is more minute as compared with a case in which Pd or Pt is formed on the seed layer composed of the Fe oxide described above. Further, the Fe oxide, which has the low wettability with respect to Pd or Pt, exists around the Fe metal. Therefore, Pd or Pt, which has been accumulated on the first seed layer, is restricted for the spread two-dimensionally, i.e., in the in-plane direction. Pd or Pt is individually dispersed at predetermined spacing distances while maintaining the minute state. Therefore, it is considered that Pd or Pt in SiN (or SiN network structure) of the second seed layer exists in a dispersed manner in an extremely minute state. When the recording layer is formed on the second seed layer as described above, the magnetic grains of the recording layer are grown in units of finely dispersed Pd or Pt. Therefore, the recording layer is obtained, which is formed of the fine and minute magnetic grains. Accordingly, the magnetic domains, which are formed in the recording layer, are also fine and minute. Thus, it is possible to further reduce the noise.

In the present invention, it is preferable that a ratio between numbers of atoms ($Fe_{Met}/Fe_{Oxi}$) satisfies a relationship of $0.02 < (Fe_{Met}/Fe_{Oxi}) < 0.2$ provided that $Fe_{Met}$ represents the number of atoms of Fe existing as metal in the first seed layer, and $Fe_{Oxi}$ represents the number of atoms of Fe existing as oxide. When the ratio between numbers of atoms is larger than 0.02, then it is possible to record information at a high density in the recording layer, and it is possible to reproduce the information at high S/N. However, if the ratio between numbers of atoms is larger than 0.2, it is feared that the Fe metal exists in an excessive amount in the seed layer, the selectivity disappears for the adsorption of the platinum group element, and it is impossible to form fine magnetic grains in the recording layer.

In the magnetic recording medium according to the first aspect of the present invention, it is preferable that the first seed layer containing the Fe oxide contains the Fe oxide in an amount of not less than 80% by volume as a whole.

In the magnetic recording medium according to the first aspect of the present invention, it is desirable that both of the film thicknesses of the first and second seed layers are within a range of 1 nm to 30 nm. If both of the film thicknesses of the first and second seed layers are less than 1 nm, it is feared that the crystalline orientation of the recording layer having the artificial lattice structure on the seed layer cannot be controlled. If both of the film thicknesses of the first and second seed layers are thicker than 30 nm, it is feared that the distance between the soft magnetic layer and the magnetic pole of the recording magnetic head is increased, and the recording magnetic field is not sufficiently applied from the recording magnetic head to the recording layer. Further, it is feared that the magnetic field from the recording magnetic head is applied to the recording layer in a state in which the magnetic field is widened, resulting in the decrease in resolution and the increase in disturbance of the magnetization transition area to cause any noise based on the jitter.

According to a second aspect of the present invention, there is provided a magnetic recording medium comprising:
  a substrate;
  a soft magnetic layer;
  a seed layer containing one of Pd and Pt, Si, and N; and
  a recording layer.

The magnetic recording medium of the present invention comprises, as an underlying base for the recording layer, the seed layer containing one of Pd and Pt, Si, and N. Such a seed layer has the same function as that of the second seed layer according to the first aspect of the present invention. Therefore, it is possible to optimally control the magnetic exchange coupling force between crystal grains and the crystalline orientation of the artificial lattice structure formed on the seed layer.

That is, it is considered that Pd or Pt exists in a dispersed manner in a microcrystalline or partially amorphous structure in SiN (or SiN network structure), when the seed layer is constructed with one of Pd and Pt, Si, and N. Further, it is considered that the artificial lattice film having the distinct grain boundary is formed, because the recording layer, which has the artificial lattice structure grown on the seed layer, is grown with nucleuses of dispersed Pd or Pt. Therefore, the magnetic exchange coupling force in the in-plane direction, which is exerted between the crystal grains of the recording layer having the artificial lattice structure, is reduced. Especially, the trace amount of N in the seed layer is bound to Si, and thus it is possible to further facilitate the dispersion of Pd or Pt. Therefore, it is possible to further weaken the magnetic exchange coupling force in the in-plane direction of the recording layer. Accordingly, it is possible to further reduce the transition noise.

In the magnetic recording medium according to the second aspect of the present invention, the contents of Si and N in the seed layer are desirably as follows. That is, the content of Si is desirably within a range of 10 atomic % to 35 atomic %, and more desirably 20 atomic % to 30 atomic %. The content of N is desirably within a range of 0.1 atomic % to 5 atomic %, and more desirably 0.5 atomic % to 5 atomic %. When the contents of Si and N in the seed layer are controlled to be within the ranges as described above, it is possible to optimize the crystalline orientation of the recording layer and the magnetic exchange coupling force in the in-plane direction. Accordingly, it is possible to reliably form the fine and minute recording magnetic domains in the recording layer, and the magnetization transition area is distinct as well. Thus, it is possible to reduce the noise. That is, it is possible to realize the reduction of the noise and the improvement of the resolution. The seed layer may further contain a trace amount of Co. In this case, it is preferable that the content of Co is within a range of 1 atomic % to 10 atomic %, while the contents of Si and N in the seed layer satisfy the ranges described above. It is preferable that the seed layer has a microcrystalline structure or a structure in which amorphous matters partially exist in a microcrystalline structure.

In the magnetic recording medium according to the second aspect of the present invention, it is desirable that the film thickness of the seed layer is within a range of 1 nm to 30 nm. If the film thickness of the seed layer is less than 1 nm, it is feared that it is impossible to control the crystalline orientation of the recording layer having the artificial lattice structure thereon. If the film thickness of the seed layer is thicker than 30 nm, it is feared that the distance between the soft magnetic layer and the magnetic pole of the recording magnetic head is increased, and the recording magnetic field is not sufficiently applied from the recording magnetic head to the recording layer. Further, it is feared that the magnetic field from the recording magnetic head is applied to the recording layer in a state in which the magnetic field is widened, resulting in the decrease in resolution and the increase in disturbance of the magnetization transition area to cause any noise based on the jitter.

In the magnetic recording media according to the first and second aspects of the present invention, the recording layer may be a recording layer having an artificial lattice structure. Preferably, the recording layer having such an artificial lattice structure is principally composed of a platinum group metal and Co, and it is preferably an alternately stacked multilayered film in which the platinum group element and Co are alternately stacked substantially in a thickness of several atoms or substantially in a thickness of single atom. For example, at least one of Pt and Pd may be used for the platinum group element. The alternately stacked multilayered film as described above can be formed as a film at the room temperature or at a relatively low substrate temperature. Further, the alternately stacked multilayered film has large magnetic anisotropy, and hence it is most preferred to be used for the recording layer for the high density recording.

In this specification, the term "artificial lattice structure" means a structure which is obtained such that a plurality of different substances are stacked mutually periodically in a certain direction in a thickness of single atom or in a thickness of several atoms. The film, which has the artificial lattice structure as described above, is also referred to as "artificial lattice film" or "alternately stacked multilayered film".

The recording layer having the artificial lattice structure is desirably a Co/Pd artificial lattice film formed by alternately stacking a Co layer which has a film thickness selected from those within a range of 0.05 nm to 0.5 nm, and a Pd layer which has a film thickness selected from those within a range of 0.5 to 2 nm, or a Co/Pt artificial lattice film formed by alternately stacking a Co layer which has a film thickness selected from those within a range of 0.05 nm to 0.5 nm, and a Pt layer which has a film thickness selected from those within a range of 0.1 to 2 nm. The perpendicular magnetic anisotropy is expressed most readily in the artificial lattice film having the structure as described above.

In the magnetic recording media according to the first and second aspects of the present invention, when the recording layer is formed by using the Co/Pd artificial lattice film or the Co/Pt artificial lattice film as described above, an additive element may be contained in the Pd layer or the Pt layer. The fluctuation of the composition occurs when the additive element is contained in the Pd layer or the Pt layer as described above. Thus, it is possible to reduce the magnetic exchange coupling force in the in-plane direction of the recording layer. The additive element is desirably Si, Al, Zr, Ti, or B, and especially preferably B. The magnetic characteristics are less deteriorated when the additive element is added to the Pd layer or the Pt layer, as compared with a case in which the additive element is added to the Co layer.

It is preferable that Co in the Co/Pd artificial lattice film or the Co/Pt artificial lattice film is distributed discontinuously in the in-plane direction. The phrase "Co in the artificial lattice film is distributed discontinuously in the in-plane direction" herein means the provision of the following structure. That is, when the cross-sectional structure of the artificial lattice film is observed, the cross section of the Co layer is observed to be substantially layered, while when the planar structure is observed, areas composed of Co are dispersed like islands on the plane. In other words, the Co layer in the artificial lattice film is not formed as a continuous film, but a plurality of areas composed of Co are dispersed like islands. Co, which is distributed discontinuously in the artificial lattice film, partially blocks the magnetic exchange coupling force. Therefore, it is possible to reduce the magnetic exchange coupling force in the in-plane direction of the recording layer.

The recording layer having the artificial lattice structure may be formed, for example, with aggregates of columnar (column-shaped) crystal grains. The diameter in a cross section perpendicular to the rotation axis of the columnar crystal grain may be within a range of 2 nm to 15 nm. The difference between the uppermost portion and the lowermost portion (height position of the grain boundary of the crystal grain) disposed on the surface of the crystal grain may be within a range of 1 nm to 10 nm. In the recording layer having the structure as described above, the magnetic exchange coupling force in the in-plane direction is reduced. Even when minute recording magnetic domains are formed in the recording layer, the magnetic domains exist in a stable manner. Further, the linearity of the magnetization transition area is high as well. Therefore, it is possible to further reduce the noise upon the reproduction.

In the magnetic recording media according to the first and second aspects of the present invention, the recording layer having the artificial lattice structure can be formed, for example, by using a sputtering apparatus which is capable of forming films alternately. For example, the recording layer can be formed as follows. That is, two or more targets, which are composed of different materials, are juxtaposed, and a substrate carrier is relatively moved alternately with respect to the respective targets. Alternatively, the recording layer can be formed as follows. That is, at least two types of ring-shaped targets having different diameters are arranged coaxially on an identical plane. A substrate is arranged so that the substrate is opposed to the targets. The film is formed by alternately effecting the discharge with the ring-shaped targets.

The film thickness of the recording film having the artificial lattice structure is preferably 5 nm to 60 nm in view of the magnetic characteristics. It is desirable for the recording layer that the coercivity, which is measured in the direction perpendicular to the substrate surface, is 1.5 kOe to 10 kOe (kilooersted). It is desirable that (Mr·t), which is the product of the film thickness t of the recording layer and the residual magnetization Mr, is within a range of 0.3 to 1.0 memu/cm$^2$. If the coercivity is smaller than 1.5 kOe, it is feared that the output, which is obtained when information recorded at a high density (not less than 600 kFCI) is reproduced, is small. Further, it is feared that the magnetic anisotropy energy is decreased, and the thermal fluctuation tends to occur. If the value of Mr·t is larger than 1.0 memu/cm$^2$, the resolution is lowered. If the value of Mr·t is smaller than 0.3 memu/cm$^2$, the output is excessively small. Therefore, it is feared that it is difficult to obtain sufficient recording and reproducing characteristics when the high density recording is performed at not less than 150 gigabits/square inch.

According to a third aspect of the present invention, there is provided a magnetic recording medium comprising:
a soft magnetic layer;
a recording layer which is formed with a hard magnetic material and which exhibits perpendicular magnetization; and
a seed layer which is located between the soft magnetic layer and the recording layer and which contains oxide of Fe.

The magnetic recording medium according to the third aspect of the present invention comprises the recording layer which is formed with the hard magnetic material to exhibit the perpendicular magnetization for recording information thereon, and the seed layer which contains the Fe oxide disposed between the recording layer and the soft magnetic layer formed with the soft magnetic material. Nucleuses of magnetic grains for constructing the recording layer can be grown at predetermined spacing distances on the surface of the seed layer. It is preferable that the recording layer contains a platinum group element. It is especially preferable that the recording layer is an alternatively stacked multilayered film obtained by alternately stacking a platinum group element and Co element. The recording layer, which is composed of aggregates of fine magnetic grains, can be formed by forming the seed layer containing the Fe oxide as an underlying base for the recording layer. The reason therefor will be explained below.

The Fe oxide, which is contained in the seed layer, has low wettability with respect to the platinum group element such as Pt and Pd for constructing the recording layer. For this reason, when Pt or Pd is accumulated on the seed layer as described above, for example, by using the sputtering method, Pt or Pd is formed while being finely dispersed in the in-plane direction on the seed layer in accordance with the surface tension. Pt or Pd, which exists in the finely dispersed manner on the seed layer as described above, serves as the nucleus for growing the magnetic grains of the recording layer. Therefore, when Co and Pt or Pd are alternately accumulated thereon, the magnetic grains are grown from the nucleuses individually in an isolated state. The magnetic grains grown as described above use the finely dispersed nucleuses as the units, and hence the magnetic grains, which are relatively fine and minute, are obtained on the seed layer. The recording layer is formed by the aggregates of such fine magnetic grains. Therefore, it is possible to form minute recording magnetic domains, and the magnetic interaction between the magnetic grains of the recording layer is reduced as well. Further, the boundary portion between the recording magnetic domains is distinct. Therefore, it is possible to reduce the noise.

In the magnetic recording medium according to the third aspect of the present invention, it is preferable that the seed layer contains Fe existing as metal (Fe metal) in addition to the Fe oxide. The magnetic recording medium, which is provided with the seed layer as described above, makes it possible to further reduce the medium noise. The reason therefor will be explained below.

It is considered that the seed layer, which contains the Fe metal in addition to the Fe oxide, is in a state in which extremely minute Fe metal particles are dispersed in the Fe oxide. As described above, the Fe oxide has the low wettability with respect to the platinum group element such as Pd or Pt as the element, for example, for constructing the recording layer. On the other hand, the Fe metal has the high wettability with respect to Pd or Pt. For this reason, when Pd or Pt is accumulated on the seed layer in which the Fe metal particles exist in the dispersed manner in the Fe oxide, Pd or Pt selectively adsorbs to the Fe metal. In this situation, the Fe metal in the seed layer is extremely minute. Therefore, Pd or Pt, which has adsorbed to the Fe metal, is more minute as compared with a case in which Pd or Pt is formed on the seed layer composed of the Fe oxide described above. Further, the Fe oxide, which has the low wettability with respect to Pd or Pt, exists around the Fe metal. Therefore, Pd or Pt, which has been accumulated on the seed layer, is restricted for the spread two-dimensionally, i.e., in the in-plane direction. Pd or Pt is individually dispersed at predetermined spacing distances while maintaining the minute state. As described above, Pd or Pt, which is dispersed extremely minutely, serves as the nucleus for growing the magnetic grains of the recording layer. Therefore, when Co and Pd or Pt are alternately accumulated thereon, the magnetic grains of the recording layer are grown from the minute nucleuses. That is, when the seed layer, which contains the Fe oxide and the Fe metal, is used as the underlying base for the recording layer, the Fe metal in the seed layer plays a role of the nucleus for growing the extremely fine magnetic grains in the recording layer. Further, the magnetic grains are grown by using the minute nucleuses as the units. Therefore, the recording layer, which is formed with the minute magnetic grains, is obtained. Accordingly, the magnetic domains, which are formed in the recording layer, are also fine and minute. Thus, it is possible to further reduce the noise.

In the magnetic recording medium according to the third aspect of the present invention, it is preferable that a ratio between numbers of atoms ($Fe_{Met}/Fe_{Oxi}$) satisfies $0.02 < (Fe_{Met}/Fe_{Oxi}) < 0.2$ provided that $Fe_{Met}$ represents the number of atoms of Fe existing as metal in the seed layer, and $Fe_{Oxi}$ represents the number of atoms of Fe existing as oxide. As illustrated by embodiments described later on, when the ratio between numbers of atoms is larger than 0.02, then it is possible to record information at a high density on the recording layer, and it is possible to reproduce the information at high S/N. However, if the ratio between numbers of atoms is larger than 0.2, it is feared that the Fe metal exists in an excessive amount in the seed layer, the selectivity disappears for the adsorption of the platinum group element, and it is impossible to form fine magnetic grains in the recording layer.

In the magnetic recording medium according to the third aspect of the present invention, it is preferable that the seed layer, which contains the Fe oxide, contains the Fe oxide in an amount of not less than 80% by volume as a whole. When the seed layer is formed by oxidizing the soft magnetic layer at a high temperature as described later on, an impurity may be contained by about 10 atomic % in addition to the Fe oxide or the Fe metal.

In the magnetic recording medium according to the third aspect of the present invention, it is preferable that the film thickness of the seed layer is not more than 30 nm in order not to lower the recording efficiency due to the magnetic spacing.

In the magnetic recording medium according to the third aspect of the present invention, the recording layer, which is formed with the hard magnetic material, may be a perpendicularly magnetizable film having magnetization in the vertical direction with respect to the film surface. A ordered alloy film can be used for the recording layer as described above in addition to the artificial lattice multilayered film (alternately stacked multilayered film) used in the first and second aspects. The hard magnetic material is preferably a material principally composed of a platinum group element and Co. At least one element of Pt and Pd is preferred for the platinum group element. It is preferable to form the recording layer by using the alternately stacked multilayered film obtained by alternately stacking the platinum group element and Co. The alternately stacked multilayered film and the ordered alloy film are excellent in productivity, because they can be formed as a film at the room temperature or at a relatively low substrate temperature. Further, the alternately stacked multilayered film and the ordered alloy film are excellent in thermal fluctuation resistance characteristics, because they have high magnetic anisotropy. Therefore, the alternately stacked multilayered film and the ordered alloy film are extremely optimum to be used as the recording layer for the high density recording.

In the magnetic recording media according to the first to third aspects of the present invention, the soft magnetic layer is preferably composed of a soft magnetic film having a microcrystalline structure obtained by uniformly dispersing, in Fe, nitride or carbide of at least one element selected from Ta, Nb, and Zr, in view of the fact that the magnetic field from the magnetic head is efficiently applied to the recording layer. Other than the materials as described above, for example, an amorphous alloy may be used, which is principally composed of Co—Zr and which contains at least one element selected from Ta, Nb, and Ti. The soft magnetic film as described above is suitable for high density recording, because the film has a large saturation magnetic flux density of not less than 1.5 T. Those usable as specified materials include, for example, NiFe, CoTaZr, CoNbZr, and FeTaC having a high magnetic permeability. The magnetic layer composed of such a material can be formed, for example, in accordance with the sputtering method and the vapor deposition method at a film thickness of not more than 1000 nm.

In the magnetic recording medium according to the second aspect of the present invention, it is preferable that the surface of the soft magnetic layer is flat. It is preferable that the surface roughness Ra of the surface of the soft magnetic layer is 0.20 nm to 0.40 nm. When the soft magnetic layer having the flat surface as described above is used, the boundary between the magnetic crystal grains of the recording layer, i.e., the crystal grain boundary is extremely distinct as illustrated in embodiments described later on. Thus, the isolation of the magnetic crystal grains of the recording layer is further facilitated. The magnetic crystal grains of the recording layer as described above are magnetically separated from each other by the crystal grain boundary. Therefore, the magnetic exchange coupling force in the in-plane direction is reduced. Accordingly, it is possible to form minute magnetic domains in the recording layer, and the linearity of the magnetization transition area is enhanced. The fact that the crystal grain boundary of the recording layer is distinct owing to the flat surface of the soft magnetic layer is considered to be based on the following principle.

It is considered that when the seed layer is formed as a film on the soft magnetic layer, if any irregularity exists on the surface of the soft magnetic layer, then sputtering particles are captured by the irregularity. For this reason, it is considered that an initial growth layer, in which grains for constructing the seed layer are grown without being separated from each other by sufficient spacing distances, is formed on the soft magnetic layer. On the contrary, when the surface of the soft magnetic layer is flat, sputtering particles, which have arrived at the surface of the soft magnetic layer, are sufficiently diffused in the in-plane direction. Therefore, an initial growth layer is formed as a film, in which grains for constructing the seed layer are grown in a state of being sufficiently separated from each other. The seed layer, which is formed on the basis of the initial growth layer with the separation of the sufficient spacing distance, is considered as follows. That is, Pd or Pt, which exists in a microcrystalline or partially amorphous structure in SiN (or SiN network structure), is also separated from each other by sufficient spacing distances, and the dispersion is further facilitated. It is considered that when the recording layer is formed as a film on the seed layer in which the dispersion of Pd or Pt is facilitated in an advanced manner, the extremely distinct crystal grain boundary is obtained in the recording layer. In order to obtain the flat surface of the soft magnetic layer, for example, the surface may be subjected to dry etching after forming the film of the soft magnetic layer.

In the magnetic recording media according to the first to third aspects of the present invention, those usable as the substrate include, for example, non-magnetic substrates such as aluminum-magnesium alloy substrates, glass substrates, and graphite substrates. The surface of the aluminum-magnesium alloy substrate may be plated with nickel-phosphorus. The substrate surface may be treated to be flat by applying diamond grinding grains or polishing tape to the substrate surface while rotating the substrate. Accordingly, when the magnetic head is allowed to float over the magnetic recording medium, it is possible to improve the traveling characteristics of the magnetic head. As for the center line roughness Ra of the substrate surface, it is desirable that the center line roughness of a protective film to be formed on the substrate is not more than 1 nm. In the case of the glass substrate, the surface may be chemically etched with a chemical agent such as strong acid so that the surface is flat. Further, any minute height structure, for example, projections of not more than 1 nm may be chemically formed on the surface. Accordingly, it is possible to realize a stable low floating amount when a negative pressure slider is used.

An adhesive layer such as those of Ti may be formed on the substrate of the magnetic recording medium in order to improve the tight contact performance before forming the film of the soft magnetic layer.

Each of the magnetic recording media according to the first to third aspects of the present invention may comprise a protective layer on the recording layer. Those preferably usable for the protective layer include, for example, any one of amorphous carbon, silicon-containing amorphous carbon, nitrogen-containing amorphous carbon, boron-containing amorphous carbon, silicon oxide, zirconium oxide, and cubic crystal system boron nitride. The method for forming the protective film of such amorphous carbon includes, for example, a method in which the film is formed by means of sputtering in an inert gas or a mixed gas of inert gas and hydrocarbon gas such as methane by using graphite as a target, a method in which the film is formed by means of plasma CVD by using an organic compound such as hydrocarbon gas, alcohol, acetone, and adamantane singly or mixed with, for example, hydrogen gas or inert gas, and a method in which the film is formed by ionizing an organic compound to effect acceleration by applying a voltage in order to make collision with the substrate. Further, the protective film may be formed by means of the ablation method in which a laser beam at a high output is collected with a lens so that the laser beam is radiated onto a target such as graphite.

A lubricant can be applied onto the protective film in order to obtain good characteristics of sliding movement resistance. Perfluoropolyether-based high molecular weight lubricant, which has a principal chain structure composed of three elements of carbon, fluorine, and oxygen, is used as the lubricant. Alternatively, a fluorine-substituted alkyl compound can be also used as the lubricant. Other organic lubricants and inorganic lubricants may be used provided that they are materials which provide stable sliding movement and durability.

The solution application method is generally used as the method for forming the lubricant. In order to avoid the global warming or simplify the process steps, a lubricant film may be formed in accordance with the photo-CVD method in which no solvent is used. The photo-CVD method is performed by radiating ultraviolet light onto a gaseous material composed of olefin fluoride and oxygen.

The film thickness of the lubricant is appropriately 0.5 nm to 3 nm as an average value. If the film thickness is thinner than 0.5 nm, the lubricant characteristics are deteriorated. If the film thickness is thicker than 3 nm, then the meniscus force is increased, and the static frictional force (stiction) between the magnetic head and the magnetic disk is increased, which is not preferred. After the lubricant film is formed as described above, the heat may be applied at about 100° C. for 1 to 2 hours in nitrogen or in air. Accordingly, any excessive solvent and low molecular weight components can be evaporated to improve the tight contact performance between the lubricant film and the protective film. Other than the post-treatment as described above, for example, a method may be used, in which ultraviolet light is radiated for a short period of time with an ultraviolet lamp after forming the lubricant film. The same or equivalent effect is also obtained in accordance with such a method.

According to a fourth aspect of the present invention, there is provided a method for producing a magnetic recording medium, comprising:

preparing a substrate;

forming a soft magnetic layer on the substrate;

forming, on the soft magnetic layer, a first seed layer containing oxide of Fe;

forming, on the first seed layer, a second seed layer containing one of Pd and Pt, Si, and N; and forming, on the second seed layer, a recording layer.

In the production method according to the fourth aspect of the present invention, the first seed layer can be formed, for example, by allowing a target principally containing Fe to be subjected to reactive sputtering by using a sputtering gas containing oxygen. The first seed layer, which is formed in accordance with the method as described above, contains the Fe oxide or the oxide of Fe. According to the production method as described above, it is possible to produce the magnetic recording medium according to the first aspect of the present invention.

In the production method according to the fourth aspect of the present invention, in order to form the second seed layer containing one of Pd and Pt, Si, and N on the first seed layer, for example, the sputtering may be performed by using two types of targets of Pd target and SiN target.

In the fourth production method of the present invention, for example, an artificial lattice film composed of a platinum group element and Co element can be formed as the recording layer having an artificial lattice structure on the second seed layer such that a target formed with the platinum group element and a target formed with Co are used to perform the sputtering while alternately opening/closing shutters for the targets.

In the production method according to the fourth aspect of the present invention, the seed layer, which contains the Fe metal in addition to the Fe oxide, can be formed by controlling the flow rate of the oxygen gas in the sputtering gas. When the seed layer, which contains the Fe oxide and the Fe metal, is used as the underlying base for the recording layer as described above, it is possible to form the aggregates of minute magnetic grains in the recording layer. Therefore, the magnetic recording medium, which is provided with the seed layer as described above, makes it possible to further reduce the medium noise.

According to a fifth aspect of the present invention, there is provided a method for producing a magnetic recording medium, comprising:

preparing a substrate;

forming a soft magnetic layer on the substrate;

forming, on the soft magnetic layer, a seed layer containing one of Pd and Pt, Si, and N; and forming, on the seed layer, a recording layer.

According to the production method as described above, it is possible to produce the magnetic recording medium according to the second aspect of the present invention.

In the production method according to the fifth aspect of the present invention, it is preferable that the surface of the soft magnetic layer is subjected to an etching treatment, for example, by means of plasma etching after forming the film of the soft magnetic layer on the substrate. Accordingly, it is possible to obtain the soft magnetic layer having a flat surface. When the seed layer, which contains one of Pd and Pt, Si, and N, is formed on the soft magnetic layer having the flat surface, and the recording layer is formed on the seed layer as described above, then the crystal grain boundary of the recording layer is extremely distinct, and the isolation of crystal grains is facilitated. In the magnetic recording medium produced by the production method of the present invention, the magnetic exchange coupling force in the in-plane direction of the recording layer is further reduced. Therefore, the linearity of the magnetization transition area is enhanced, and it is possible to reduce the noise.

According to a sixth aspect of the present invention, there is provided a method for producing a magnetic recording medium, comprising:

preparing a substrate;

forming a soft magnetic layer on the substrate;

forming, on the soft magnetic layer, a seed layer containing oxide of Fe; and forming a recording layer on the seed layer.

In the production method according to the sixth aspect of the present invention, for example, the seed layer can be formed by allowing a target principally containing Fe to be subjected to reactive sputtering by using a sputtering gas containing oxygen. The seed layer, which is formed in accordance with the method as described above, contains the Fe oxide. According to the production method as described above, it is possible to produce the magnetic recording medium according to the third aspect of the present invention.

In the production method according to the sixth aspect of the present invention, the seed layer, which contains the Fe metal in addition to the Fe oxide, can be formed by controlling the flow rate of the oxygen gas in the sputtering gas. When the seed layer, which contains the Fe oxide and the Fe metal, is used as the underlying base for the recording layer as described above, it is possible to form the aggregates of minute magnetic grains in the recording layer. Therefore, the magnetic recording medium, which is provided with the seed layer as described above, makes it possible to further reduce the medium noise. When the Fe metal is formed in the seed layer by controlling the flow rate of the oxygen gas as described above, it is desirable that the surface of the seed layer is subjected to sputtering etching during the period from the formation of the seed layer to the formation of the recording layer on the seed layer. The reason therefor will be explained below.

The oxygen gas remains in a film-forming chamber after the seed layer is formed by means of the reactive sputtering by using the sputtering gas containing the oxygen gas. A certain period of time is required to completely evacuate the oxygen gas. Therefore, during this period, a thin oxide film is formed on the surface of the Fe metal in the seed layer due to the oxygen gas remaining in the chamber. Such an oxide film inhibits the adsorption of the platinum group element in the recording layer to the Fe metal, for example, when the recording layer containing the platinum group element is formed on the seed layer. Therefore, it is feared that the adsorption selectivity for the platinum group element is lowered. Accordingly, as described above, the oxide film, which is formed on the surface of the Fe metal, is removed by sputtering-etching the surface of the seed layer after forming the film of the seed layer. Thus, the platinum group element such as Pd and Pt for constructing the recording layer can be reliably adsorbed to the Fe metal on the surface of the seed layer. Therefore, it is possible to form the minute magnetic grains in the recording layer. Those preferably used as the gas to be used for the sputtering etching include an inert gas such as Ar, Kr, and Xe, and a mixed gas of such an inert gas and hydrogen gas.

In the production method according to the sixth aspect of the present invention, for example, when a soft magnetic layer containing Fe is used as the soft magnetic layer, the seed layer containing the Fe oxide can be also formed by oxidizing the surface of the soft magnetic layer at a high temperature after forming the soft magnetic layer containing Fe.

In the production methods according to the fourth to sixth aspects of the present invention, those usable as the method for forming the soft magnetic layer, the first seed layer, the second seed layer, and the recording layer include, for example, the vacuum vapor deposition method, the MBE method, the sputtering method, the ion beam method, the molecular layer epitaxy method, and the plasma CVD. Those useable as the sputtering method include, for example, known sputtering methods such as the ECR sputtering method, the DC sputtering method, and the RF sputtering method.

According to a seventh aspect of the present invention, there is provided a magnetic storage apparatus comprising:
the magnetic recording medium according to any one of the first to third aspects;
a magnetic head which is used to record or reproduce information; and
a driving unit which drives the magnetic recording medium with respect to the magnetic head.

The magnetic storage apparatus of the present invention is provided with the magnetic recording medium according to any one of the first to third aspects of the present invention. Therefore, even when information is recorded at a high areal recording density, the information can be reproduced at high S/N. Further, the magnetic storage apparatus possesses excellent thermal fluctuation resistance.

In the magnetic storage apparatus of the present invention, the magnetic head may comprise a recording magnetic head for recording information on the magnetic recording medium, and a reproducing magnetic head for reproducing information recorded on the magnetic recording medium. It is desirable that the gap length of the recording magnetic head is 0.2 μm to 0.02 μm. If the gap length exceeds 0.2 μm, it is difficult to perform recording at a high linear recording density of not less than 400 kFCI. It is difficult to produce a recording head having a gap length smaller than 0.02 μm. In the case of such a recording head, the device tends to be destroyed due to the static electricity induction.

The reproducing magnetic head can be constructed by using a magnetoresistance effect element. It is desirable that the reproduction shield interval of the reproducing magnetic head is 0.2 μm to 0.02 μm. The reproduction shield interval directly relates to the reproducing resolution. The shorter the reproduction shield interval is, the higher the resolution is. It is desirable that the lower limit value of the reproduction shield interval is appropriately selected within the range described above, depending on, for example, the stability of the element, the reliability, the electric resistance characteristics, and the output.

In the magnetic storage apparatus of the present invention, the driving unit can be constructed with a spindle for rotating and driving the magnetic recording medium. It is desirable that the velocity of rotation of the spindle is 3000 revolutions per minute to 20000 revolutions per minute. If the velocity of rotation of the spindle is slower than 3000 revolutions per minute, the data transfer speed is low, which is not preferred. If the velocity of rotation of the spindle exceeds 20000 revolutions per minute, the noise and the heat generation of the spindle are increased, which is not desirable. Taking the velocity of rotation as described above into consideration, the optimum relative velocity between the magnetic recording medium and the magnetic head is 2 m/second to 30 m/second.

BRIEF DESCRIPTION OF THE DRAWINGS

FIG. 7 shows images observed with TEM for recording layers of magnetic recording media, wherein FIG. 7(a) shows the image observed with TEM for the recording layer of the magnetic recording medium produced by plasma-etching the surface of the soft magnetic layer, and FIG. 7(b) shows the image observed with TEM for the recording layer of the magnetic recording medium produced without performing any plasma etching for the surface of the soft magnetic layer.

FIG. 8 shows histograms illustrating the diameters of crystal grains and the numbers of grains of recording layers of magnetic recording media, wherein FIG. 8(a) shows a case of the magnetic recording medium produced by plasma-etching the surface of the soft magnetic layer, and FIG. 8(b) shows a case of the magnetic recording medium produced without performing any plasma etching for the surface of the soft magnetic layer.

FIG. 9 shows images observed with AFM, wherein

FIG. 9(a) shows the image observed with AFM for the surface of the soft magnetic layer before performing the plasma etching, and FIG. 9(b) shows the image observed with AFM for the surface of the soft magnetic layer after performing the plasma etching.

FIG. 13 shows a table illustrating results of recording and reproduction characteristics of magnetic disks of Examples 10 to 14 and Comparative Examples 4 to 7.

FIG. 14 shows a table illustrating results of recording and reproduction characteristics of magnetic disks of Examples 15 to 23.

DESCRIPTION OF PREFERRED EMBODIMENTS

Examples of the magnetic recording medium according to the present invention and the magnetic storage apparatus based on the use of the same will be specifically explained below with reference to the drawings. In Examples described below, magnetic disks (hard disks) were produced as magnetic recording media. However, the present invention is also applicable to recording media of the type in which the magnetic head and the magnetic recording medium make contact during recording or reproduction, for example, in the case of floppy disks, magnetic tapes, and magnetic cards.

EXAMPLE 1

Figure 1:
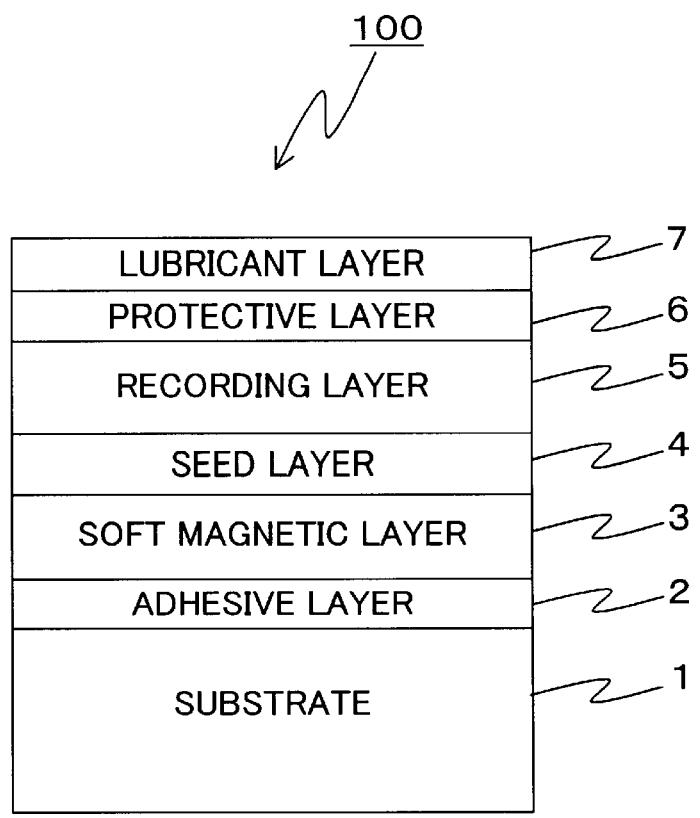
FIG. 1 shows a schematic sectional view illustrating a magnetic recording medium according to the present invention produced in Example 1.

FIG. 1 shows a schematic sectional view illustrating a magnetic recording medium according to the present invention. The magnetic recording medium 100 comprises a soft magnetic layer 3, a seed layer 4, a recording layer 5, a protective layer 6, and a lubricant layer 7 on a substrate 1 having a adhesive layer 2. A method for producing the magnetic recording medium 100 having such a stacked structure will be described below.

At first, the glass substrate 1 having a diameter of 65 mm was prepared. A film of Ti having a thickness of 5 nm was formed as the adhesive layer 2 on the glass substrate 1 by using a continuous sputtering apparatus.

Subsequently, a film of $Fe_{79}Ta_9C_{12}$ was formed to have a film thickness of 400 nm as the soft magnetic layer 3 on the adhesive layer 2. The formed film of $Fe_{79}Ta_9C_{12}$ was heated for 30 seconds at a temperature of 450° C. in vacuum with a carbon heater, and then the film was gradually cooled. Thus, the soft magnetic layer 3 containing microcrystals of Fe was formed.

Subsequently, the substrate 1 was transferred to a chamber of an alternate sputtering apparatus to form a film of the seed layer 4 on the soft magnetic layer 3. When the film of the seed layer 4 was formed, argon gas was introduced into the chamber, while a Pd target was subjected to DC sputtering, and an SiN target was subjected to RF sputtering. Accordingly, the seed layer 4, which was composed of 73 atomic % of Pd, 26 atomic % of Si, and 1 atomic % of N, was formed to have a film thickness of 5 nm on the soft magnetic layer 3.

Subsequently, the recording layer 5 having an artificial lattice structure was formed as a film on the seed layer 4. When the recording layer 5 was formed, DC sputtering was performed while alternately opening/closing shutters for a Co target and a Pd target in Ar gas to form the recording layer 5 having the artificial lattice structure in which Co layers and Pd layers were alternately stacked. The film thickness of the Co layer per one layer was 0.12 nm, and the film thickness of the Pd layer per one layer was 0.85 nm. The numbers of stacked layers of the Pd layers and the Co layers were twenty-six respectively.

Subsequently, the protective layer 6, which was composed of amorphous carbon, was formed to have a film thickness of 3 nm on the recording layer 5 by means of the plasma CVD method. After the protective layer 6 was formed, the substrate was taken out of the film-forming apparatus. Finally, a perfluoropolyether-based lubricant was applied with a thickness of 1 nm on the protective layer 6 to form the lubricant layer 7.

Thus, the magnetic recording medium 100 having the stacked structure shown in FIG. 1 was produced.

EXAMPLE 2

A magnetic recording medium was produced in the same manner as in Example 1 except that Co was contained in the seed layer. When the seed layer was formed as a film, Ar gas was introduced into the chamber, while a Co target and a Pd target were subjected to DC sputtering, and an SiN target was subjected to RF sputtering. Accordingly, the seed layer, which was composed of 6 atomic % of Co, 70 atomic % of Pd, 23 atomic % of Si, and 1 atomic % of N, was formed on the soft magnetic layer.

EXAMPLE 3

In Example 3, a recording layer having an artificial lattice structure was formed such that Co layers each having a film thickness of 0.15 nm and Pt layers each having a film thickness of 0.85 nm were formed repeatedly in 15 cycles in accordance with the alternate sputtering method. In order to appropriately control the crystal growth of the recording layer having such an artificial lattice structure, a seed layer, which was composed of 73 atomic % of Pt, 26 atomic % of Si, and 1 atomic % of N, was formed as the seed layer to have a film thickness of 5 nm. Other than the above, a magnetic recording medium was produced in the same manner as in Example 1.

EXAMPLE 4

Figures 3, 4:
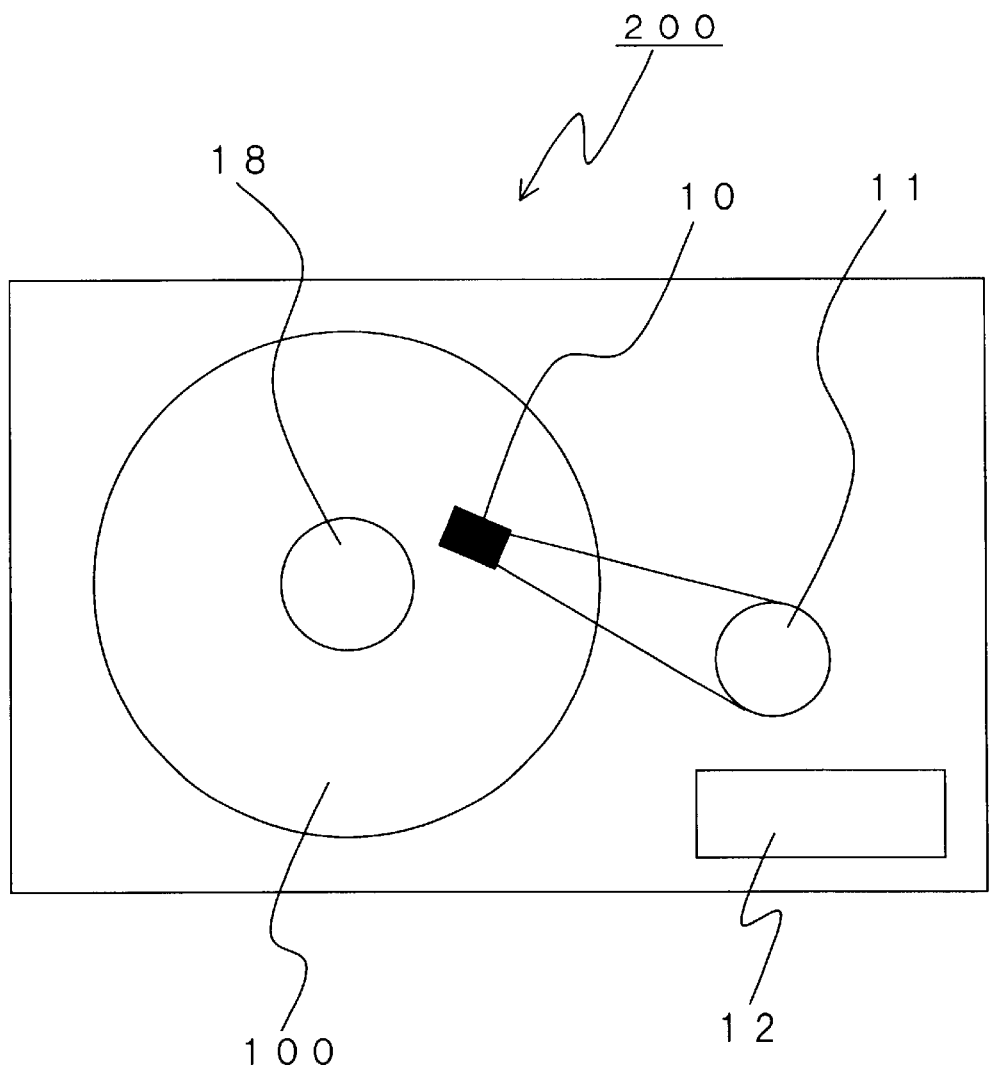
FIG. 3 shows a schematic plan view illustrating a magnetic storage apparatus according to the present invention.
FIG. 4 shows results of measurement of electromagnetic conversion characteristics of the magnetic recording medium produced in Example 1.

FIG. 3 shows a schematic arrangement of a magnetic storage apparatus 200 according to the present invention. The magnetic storage apparatus 200 comprises the magnetic recording medium 100, a rotary driving section 18 for driving and rotating the magnetic recording medium 100, a magnetic head 10, a head-driving unit 11 for moving the magnetic head 10 to a desired position over the magnetic recording medium, and a recording and reproduction signal-processing unit 12. The magnetic recording medium produced in Example 1 was used for the magnetic recording medium 100. The magnetic head 10 includes a single magnetic pole type writing element and a GMR (Giant Magneto-Resistive) reading element. The magnetic head 10 is provided at the tip of an arm of the head-driving unit 11. The single magnetic pole type writing element of the magnetic head 10 is capable of recording information on the magnetic recording medium such that a magnetic field corresponding to data to be recorded is applied to the magnetic recording medium when the information is recorded. The GMR reading element of the magnetic head 10 is capable of reproducing information recorded on the magnetic recording medium by detecting the change of leak magnetic field from the magnetic recording medium. The recording and reproduction signal-processing unit 12 is capable of encoding data to be recorded on the magnetic recording medium 100 to transmit a recording signal to the single magnetic pole type writing element of the magnetic head 10. The recording and reproduction signal-processing unit 12 is also capable of decoding a reproduced signal from the magnetic recording medium 100 detected by the GMR reading element of the magnetic head 10.

The magnetic storage apparatus 200 as described above was driven to record information under a condition of a linear recording density of 1000 kBPI and a track density of 150 kTPI, while maintaining the magnetic spacing (distance between the surface of the major magnetic pole of the magnetic head 10 and the surface of the recording layer of the magnetic recording medium 100) to be 13 nm. The recorded information was reproduced to evaluate the recording and reproduction characteristics. As a result, 24.5 dB was obtained as total S/N. The recording and reproduction were successfully performed at a recording density of areal recording density of 150 gigabits/square inch. The following head seek test was performed. The magnetic head was subjected to the seek one hundred thousand times from the inner circumference to the outer circumference over the magnetic recording medium. The bit error of the magnetic recording medium was measured after the head seek test as described above. As a result, the bit error number was not more than 10 bits/surface. An average failure interval of three hundred thousand hours was successfully achieved. S/N was determined by using the following expression.

$$S/N = 20 \log(S_{0-p}/N_{rms})$$

In the expression, $S_{0-p}$ represents the value which is a half of the reproduced signal amplitude, zero point to the peak (zero to peak), and $N_{rms}$ represents the quadratic square mean value of the amplitude of the noise measure with a spectrum analyzer.

COMPARATIVE EXAMPLE 1

A magnetic recording medium was produced in the same manner as in Example 1 except that a layer composed of Pd was formed as a seed layer to have a film thickness of 5 nm.

COMPARATIVE EXAMPLE 2

A magnetic recording medium was produced in the same manner as in Example 3 except that a layer composed of Pt was formed as a seed layer to have a film thickness of 5 nm.

COMPARATIVE EXAMPLE 3

The magnetic recording medium of Comparative Example 1 was carried on the magnetic storage apparatus 200 shown in Example 4 to evaluate recording and reproduction characteristics. The recording and reproduction characteristics were evaluated under a condition in which the magnetic spacing was 13 nm, the linear recording density was 1000 kBPI, and the track density was 150 kTPI. As a result, total S/N was 18.5 dB, and it was impossible to perform sufficient recording and reproduction. Further, the recording was performed at a recording density of 50 gigabits/square inch of the areal recording density. After that, the following head seek test was performed. The magnetic head was subjected to the seek one hundred thousand times from the inner circumference to the outer circumference over the magnetic recording medium. The bit error of the magnetic recording medium was measured after the head seek test as described above. As a result, the bit error number was not more than 150 bits/surface. An average failure interval of one hundred and ninety thousand hours was obtained.

Measurement of Electromagnetic Conversion Characteristics

Next, the electromagnetic conversion characteristics of the magnetic recording media of Examples 1 to 3 and Comparative Examples 1 and 2 were measured by using a spin stand recording and reproduction test (playback test) machine. A composite type head of a single magnetic pole type writing element and a GMR reading element was used as the magnetic head for the recording and reproduction test machine. The effective writing track width of the main pole (major magnetic pole) of the single magnetic pole type writing element was 10 nm, and Bs was 2.1 T. The effective track width of the GMR element was 97 nm, and the shield interval was 45 nm. When the recording and reproduction test (playback test) was performed, the spacing distance between the surface of the major magnetic pole of the single magnetic pole type writing element of the magnetic head and the surface of the recording layer of the magnetic recording medium was 13 nm. Results of the measurement of the electromagnetic conversion characteristics are shown in FIG. 4. In FIG. 4, S/Nd represents S/N at 500 kFCI, and Re represents the output resolution divided by the solitary wave output. The thermal demagnetization ratio represents the ratio of the change of the reproduced signal amplitude with respect to the time upon the reproduction of the signal recorded at a linear recording density of 100 kFCI. As clarified from FIG. 4, good S/N was obtained and the resolution was high, i.e., not less than 18% in each of the magnetic recording media produced in Examples 1 to 3. On the contrary, the resolution was less than 10% in each of the magnetic recording media of Comparative Examples. According to this fact, it is appreciated that the transition noise is reduced even in the high region, and both of the high resolution and high S/N are satisfied in each of the magnetic recording media of Examples 1 to 3.

Observation of Cross-Sectional Structure of Recording Layer

Figure 2:
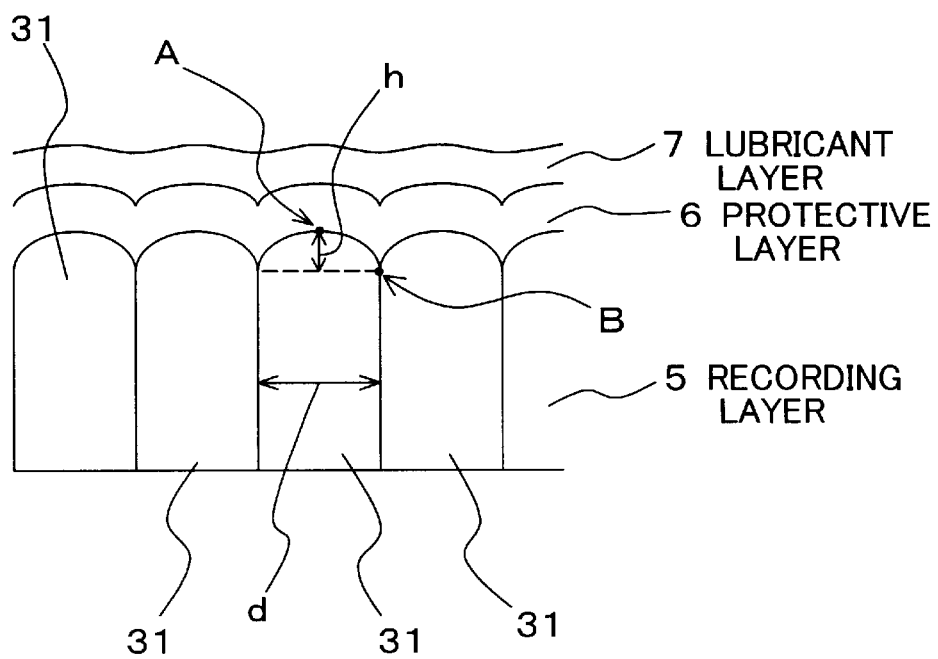
FIG. 2 schematically shows a cross-sectional structure of a recording layer of the magnetic recording medium.

Next, the cross-sectional structure of the recording layer of each of the magnetic recording media of Examples 1 to 3 was observed by using a high resolution transmission electron microscope. FIG. 2 schematically shows a result of the observation of the cross-sectional structure of the recording layer 5 having the artificial lattice structure. As shown in FIG. 2, the recording layer 5 was composed of aggregates of crystal grains 31 each having a columnar configuration. The upper surface of each of the crystal grains 31 was hemispherical. The diameter d of the cross section perpendicular to the rotation axis of the columnar crystal grain was about 8 nm, and the difference h between the uppermost portion A and the lowermost portion B of the hemisphere of the surface of the crystal grain was 2 nm. It is considered that the magnetic coupling force in the in-plane direction is reduced, the minute recording bit is stable, and the linearity of the magnetization transition area is improved, because the recording layer 5 is composed of the columnar crystal grains as described above.

As understood from the result of the thermal decay ratio at 24° C. shown in FIG. 4, no thermal decay was observed in each of the magnetic recording media of Examples 1 to 3. On the contrary, the decay due to the thermal fluctuation was conspicuously observed in each of the magnetic recording media of Comparative Examples 1 and 2. This result indicates the following fact. That is, the magnetization transition area of the recording layer is distinct, and the linearity is high in each of the magnetic recording media of Examples 1 to 3. On the contrary, in each of the magnetic recording media of Comparative Examples 1 and 2, the magnetization transition area is disordered, and the medium tends to undergo any thermal fluctuation. The error rate was measured at 1000 kBPI in an on-track manner. As a result, the error rate was not more than $1 \times 10^{-5}$ in each of the magnetic recording media of Examples 1 to 3. On the contrary, the error rate was not less than $1 \times 10^{-4}$ in each of the magnetic recording media of Comparative Examples 1 and 2.

EXAMPLE 5

In Example 5, nine types of magnetic recording media (Samples 1 to 9) were produced in the same manner as in Example 1 except that the composition of the seed layer was changed to have values shown in the following table. S/Nd, Re, and the thermal demagnetization ratio were measured for the obtained nine types of the magnetic recording media by using the spin stand recording and reproduction test machine in the same manner as in the measurement of the electromagnetic conversion characteristics described above. Results of the measurement are shown in the following table.

TABLE 1

| | Composition of seed layer | | | | | Thermal decay ratio (%/decade) |
|---|---|---|---|---|---|---|
| | Pd (at %) | Si (at %) | N (at %) | S/Nd (dB) | Re (%) | |
| Sample 1 | 75 | 20 | 5 | 15.1 | 20.5 | 0 |
| Sample 2 | 70 | 20 | 10 | 15.0 | 20.6 | 0 |
| Sample 3 | 70 | 29.5 | 0.5 | 15.1 | 20.3 | 0 |
| Sample 4 | 79 | 20 | 1 | 14.9 | 19.0 | 0 |
| Sample 5 | 80 | 10 | 10 | 14.8 | 19.1 | 0 |
| Sample 6 | 60 | 30 | 10 | 14.7 | 19.0 | 0 |
| Sample 7 | 55 | 35 | 10 | 14.6 | 19.0 | 0 |
| Sample 8 | 90 | 5 | 5 | 10.0 | 8.5 | −5.5 |
| Sample 9 | 40 | 50 | 10 | 8.0 | 8.2 | −6.0 |

As appreciated from Table 1 depicted above, extremely excellent S/Nd of not less than 14.6% was obtained in each of the magnetic recording media of Samples 1 to 7. The resolution was also high, i.e., not less than 19%. That is, high S/N and the high resolution were realized. No thermal decay was observed in each of the magnetic recording media of Samples 1 to 7. It is understood that the thermal stability is high. On the other hand, both of S/Nd and the resolution were low in each of the magnetic recording media of Samples 8 and 9. Further, the thermal decay was observed. According to the results described above, it is considered that relatively high S/N and the relatively high resolution are obtained, and the thermal stability is excellent, when the composition of the seed layer of PdSiN of the magnetic recording medium satisfies that Pd is 50 atomic % to 80 atomic %, Si is 10 atomic % to 35 atomic %, and N is 0.1 atomic % to 10 atomic %.

EXAMPLE 6

In Example 6, nine types of magnetic recording media (Samples 10 to 18) were produced in the same manner as in Example 3 except that the composition of the seed layer was changed to have values shown in the following Table 2. S/Nd, Re, and the thermal decay ratio were measured for the obtained nine types of the magnetic recording media by using the spin stand recording and reproduction test machine in the same manner as in the measurement of the electromagnetic conversion characteristics described above. Results of the measurement are shown in the following Table 2.

TABLE 2

| | Composition of seed layer | | | | | Thermal decay ratio (%/decade) |
|---|---|---|---|---|---|---|
| | Pt (at %) | Si (at %) | N (at %) | S/Nd (dB) | Re (%) | |
| Sample 10 | 75 | 20 | 5 | 14.6 | 18.2 | 0 |
| Sample 11 | 70 | 20 | 10 | 14.4 | 18.0 | 0 |
| Sample 12 | 70 | 29.5 | 0.5 | 14.5 | 18.1 | 0 |
| Sample 13 | 79 | 20 | 1 | 14.0 | 18.0 | 0 |
| Sample 14 | 80 | 10 | 10 | 14.0 | 17.9 | 0 |
| Sample 15 | 60 | 30 | 10 | 13.9 | 18.0 | 0 |
| Sample 16 | 55 | 35 | 10 | 13.9 | 17.8 | 0 |
| Sample 17 | 90 | 5 | 5 | 8.8 | 7.5 | −6.2 |
| Sample 18 | 40 | 50 | 10 | 6.8 | 7.0 | −5.6 |

As appreciated from Table 2, extremely excellent S/Nd of not less than 14.6% was obtained in each of the magnetic recording media of Samples 10 to 16. The resolution was also high, i.e., not less than 19%. That is, high S/N and the high resolution were realized. No thermal decay was observed in each of the magnetic recording media of Samples 10 to 16. It is understood that the thermal stability is high. On the other hand, both of S/Nd and the resolution were low in each of the magnetic recording media of Samples 17 and 18. Further, the thermal decay was observed. According to the results described above, it is appreciated that relatively high S/N and the relatively high resolution are obtained, and the thermal stability is excellent, when the composition of the seed layer of PtSiN of the magnetic recording medium satisfies that Pt is 50 atomic % to 80 atomic %, Si is 10 atomic % to 35 atomic %, and N is 0.1 atomic % to 10 atomic %.

EXAMPLE 7

Figure 5:
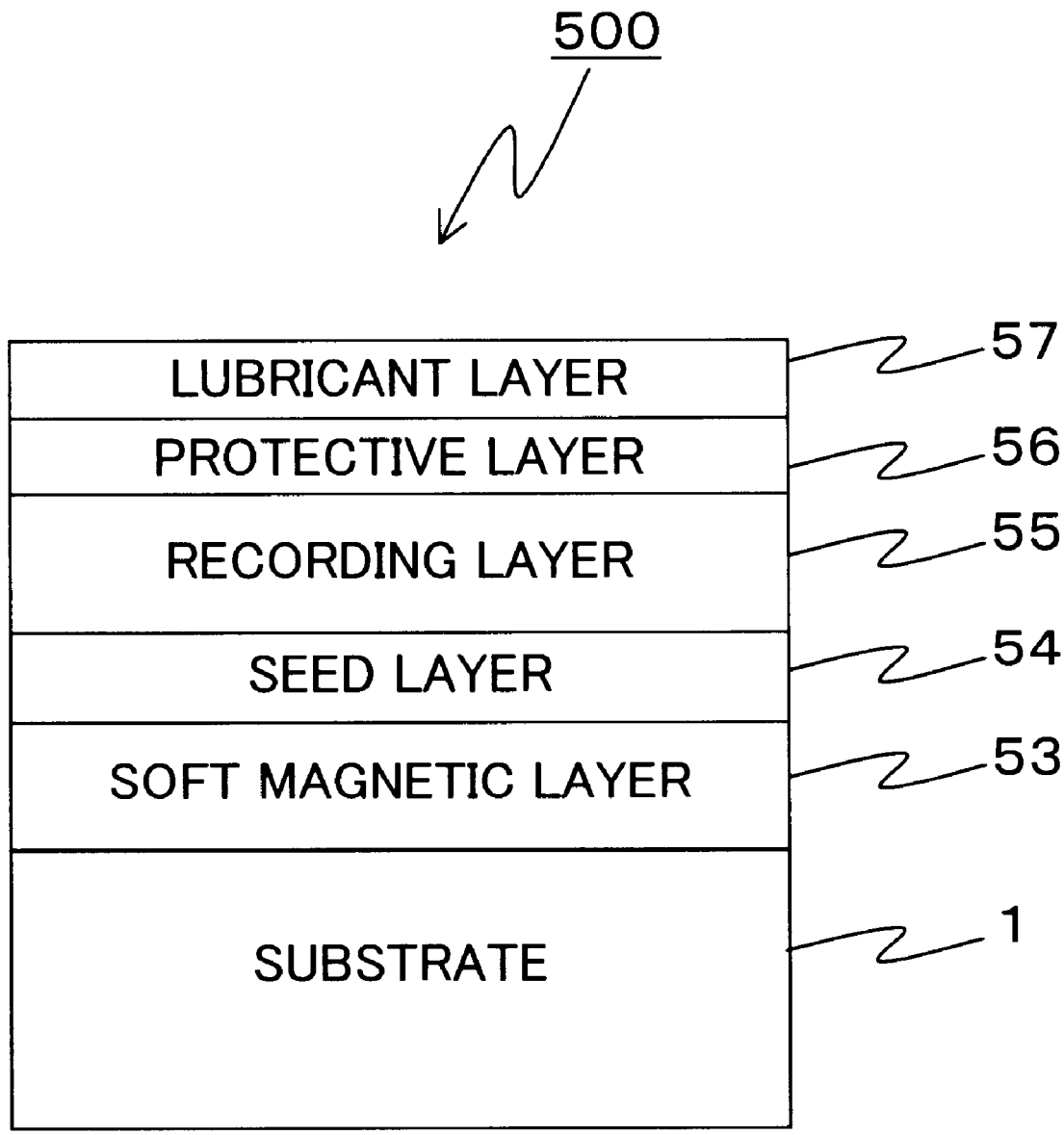
FIG. 5 shows a schematic sectional view illustrating a magnetic recording medium produced in Example 7.

FIG. 5 shows a schematic sectional view illustrating a magnetic recording medium according to Example 7. The magnetic recording medium 500 comprises a soft magnetic layer 53, a seed layer 54, a recording layer 55, a protective layer 56, and a lubricant layer 57 on a substrate 1. The magnetic recording medium as described above was produced as follows.

At first, the glass substrate 1 having a diameter of 65 mm was prepared. A film of $Fe_{79}Ta_9C_{12}$ was formed to have a film thickness of 400 nm as the soft magnetic layer 53 on the glass substrate 1. In order to enhance the saturation magnetization of the formed film of $Fe_{79}Ta_9C_{12}$, the film was heated for 30 seconds at a temperature of 400° C. in vacuum with a carbon heater, and then the film was gradually cooled. After the heating treatment as described above, the surface of the soft magnetic layer 53 was subjected to a plasma etching treatment. The plasma etching treatment was performed for 120 seconds at an Ar gas pressure of 0.9 Pa with a power of 500 W.

Subsequently, the substrate 1 was transferred to a chamber of an alternate sputtering apparatus to form a film of the seed layer 54 on the soft magnetic layer 53. When the film of the seed layer 54 was formed, argon gas was introduced into the chamber, while a Pd target was subjected to DC sputtering, and an SiN target was subjected to RF sputtering. Accordingly, the seed layer 54, which was composed of 70 atomic % of Pd, 20 atomic % of Si, and 10 atomic % of N, was formed to have a film thickness of 3 nm on the soft magnetic layer 53.

Subsequently, the recording layer 55 having an artificial lattice structure was formed as a film on the seed layer 54. When the recording layer 55 was formed, DC sputtering was performed while alternately opening/closing shutters for a Co target and a Pd target in Ar gas to form the recording layer 55 having the artificial lattice structure in which Co layers and Pd layers were alternately stacked. The film thickness of the Co layer per one layer was 0.2 nm, and the film thickness of the Pd layer per one layer was 0.8 nm. The numbers of stacked layers of the Pd layers and the Co layers were twenty-six respectively.

Subsequently, the protective layer 56, which was composed of amorphous carbon, was formed to have a film thickness of 3 nm on the recording layer 55 by means of the plasma CVD method. After the protective layer 56 was formed, the substrate was taken out of the film-forming apparatus. Finally, a perfluoropolyether-based lubricant was applied with a thickness of 1 nm on the protective layer 56 to form the lubricant layer 57.

Thus, the magnetic recording medium 500 having the stacked structure shown in FIG. 5 was produced. On the other hand, in order to investigate the effect brought about by the plasma etching for the surface of the soft magnetic layer, a magnetic recording medium was produced in the same manner as described above except that the surface of the soft magnetic layer was not subjected to the plasma etching.

Figure 6:
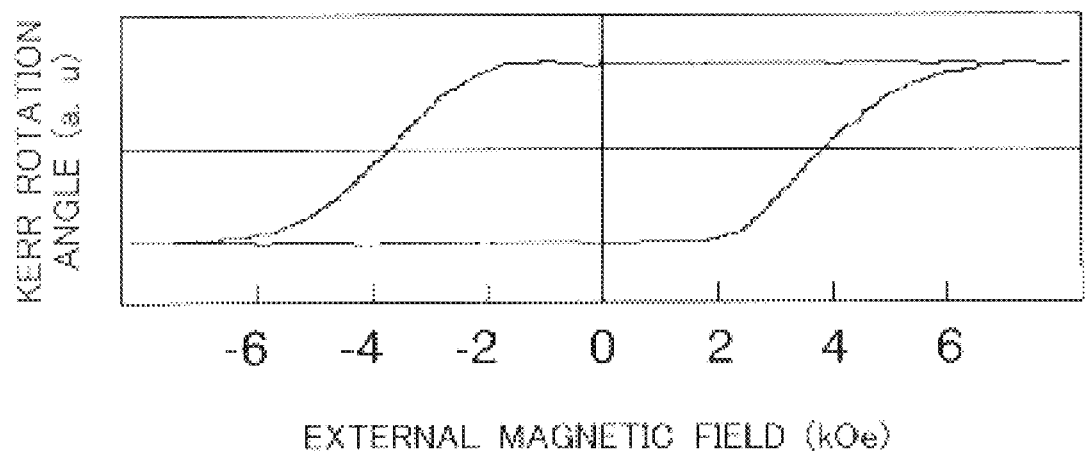
FIG. 6 shows a Kerr rotation angle curve with respect to the external magnetic field exerted on a magnetic recording medium produced by plasma-etching a surface of a soft magnetic layer.

The change of the Kerr rotation angle of the recording layer was measured while applying an external magnetic field in the vertical direction with respect to the film surface for the magnetic recording medium having the surface of the soft magnetic layer subjected to the etching treatment and the magnetic recording medium having the surface of the soft magnetic layer not subjected to the etching treatment. FIG. 6 shows a Kerr rotation angle curve with respect to the external magnetic field for the magnetic recording medium subjected to the etching treatment. The Kerr rotation angle of the recording layer is proportional to the magnitude of the magnetization of the recording layer. Therefore, the Kerr rotation angle curve, which represents the relationship between the Kerr rotation angle and the external magnetic field, has a shape which is substantially equivalent to the shape of a magnetization curve determined by the ordinary magnetization measurement. The Kerr rotation angle curve exhibits the hysteresis. In Example 7, the coercivity of the recording layer, the nucleation magnetic field, the slope at an external magnetic field H=Hc, which is expressed as $4\pi(dM/dH)_{H=Hc}$, were estimated from the Kerr rotation angle curve.

It is herein noted that the nucleation magnetic field refers to the field in which reversed domains (domains which have magnetization in the opposite direction) occurs when the external field is gradually applied in the opposite direction after the magnetization of the medium was saturated perpendicularly. That is the field at the shoulder of perpendicular Kerr loop in the second quadrant in FIG. 6.

In the case of the magnetic recording medium subjected to the etching treatment, the coercivity Hc was 3.9 kOe, the negative nucleation magnetic field was −2.1 kOe, the slope at the external magnetic field H=Hc, which is expressed as $4\pi(dM/dH)_{H=Hc}$, was 1.4. On the other hand, in the case of the magnetic recording medium not subjected to the etching treatment, the coercivity Hc was 2.6 kOe, the nucleation magnetic field was −1.6 kOe, the slope at the external magnetic field H=Hc, which is expressed as $4\pi(dM/dH)_{H=Hc}$, was 1.8.

Figure 7:
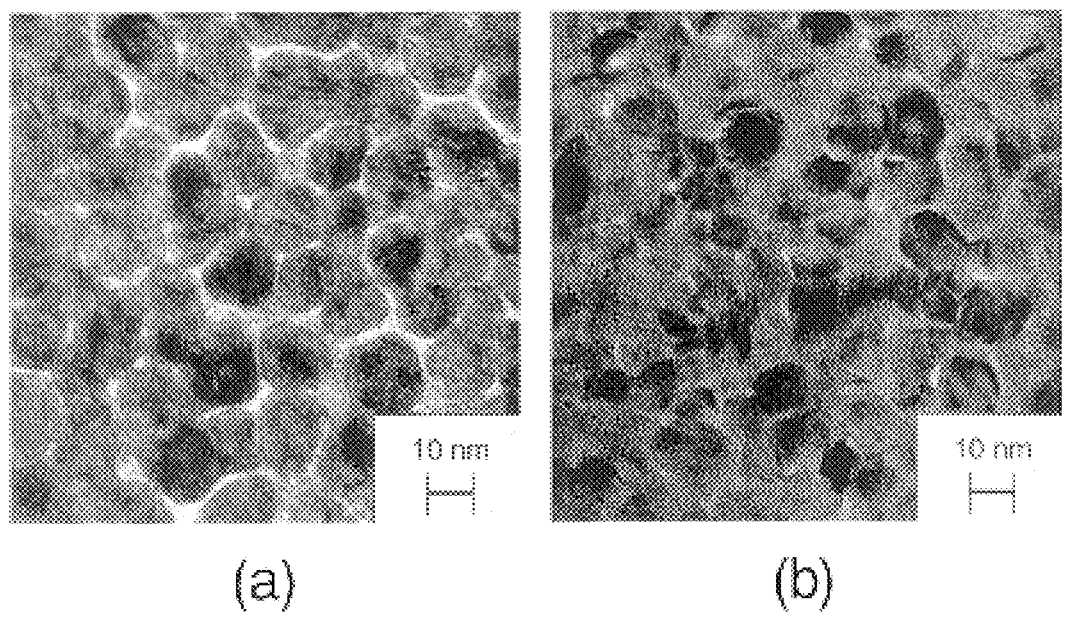

Next, the surfaces of the recording layers of the magnetic recording medium subjected to the etching treatment for the soft magnetic layer and the magnetic recording medium not subjected to the etching treatment were observed with a transmission electron microscope (TEM). FIGS. 7(*a*) and 7(*b*) show images observed with TEM for the surfaces of the recording layers of the magnetic recording medium subjected to the etching treatment and the magnetic recording medium not subjected to the etching treatment. As shown in FIG. 7(*a*), it is appreciated that aggregates of isolated columnar crystal grains are formed in the recording layer of the magnetic recording medium subjected to the etching treatment, and the boundary between crystal grains, i.e., the crystal grain boundary is extremely distinct. On the other hand, as shown in FIG. 7(*b*), the crystal grain boundary was indistinct in the recording layer of the magnetic recording medium not subjected to the etching treatment, as compared with the recording layer of the magnetic recording medium subjected to the etching treatment.

The degree of dispersion (value obtained by dividing the standard deviation by the average value) and the average grain diameter of the crystal grains were determined from the TEM image of the surface of the recording layer. FIG. 8 shows the relationship between the diameters of 610 individuals of crystal grains of the recording layer and the number of crystal grains in histograms. FIG. 8(*a*) shows a histogram of the magnetic recording medium subjected to the etching treatment, and FIG. 8(*b*) shows a histogram of the magnetic recording medium not subjected to the etching treatment. In the case of the magnetic recording medium subjected to the etching treatment, the average grain diameter was 13.7 nm, and the degree of dispersion was 21.7%. On the other hand, in the case of the magnetic recording medium not subjected to the etching treatment, the average grain diameter was 11.3 nm, and the degree of dispersion was 21.0%.

The cross section of the seed layer of the magnetic recording medium subjected to the etching treatment was observed with TEM. As a result, the seed layer had a disordered structure. It is considered that the Co/Pd initial layer can be formed in a dispersed manner on the surface of the seed layer having such a disordered structure, and the columnar crystal grains are grown in an isolated state by using the unit of such a Co/Pd initial layer.

Next, the recording and reproduction test was performed by using the spin stand recording and playback test machine used in Example 1, for the magnetic recording medium subjected to the etching treatment and the magnetic recording medium not subjected to the etching treatment. As a result, S/N of the magnetic recording medium subjected to the etching treatment was higher than that of the magnetic recording medium not subjected to the etching treatment by 1.6 dB.

Figure 9:
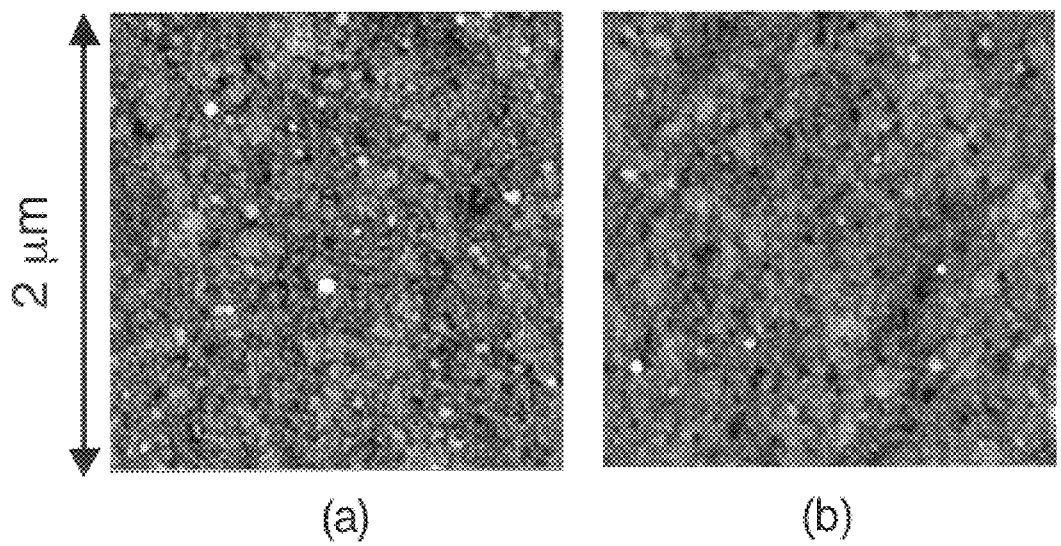

An atomic force microscope (AFM) was used to measure the surface roughness obtained immediately after forming the film of the soft magnetic layer and the surface roughness obtained after the plasma etching. FIGS. 9(a) and 9(b) show observed images with AFM for the surface immediately after forming the film of the soft magnetic layer and the surface after the plasma etching respectively. The surface roughness of the soft magnetic layer was estimated from the observed image. As a result, the surface roughness obtained immediately after forming the film of the soft magnetic layer was 0.46 nm, while the surface roughness of the soft magnetic layer subjected to the plasma etching was 0.39 nm. It is understood that the surface of the soft magnetic layer is made flat by performing the plasma etching. It is considered that the realization of the flat surface of the soft magnetic layer brought about by the plasma etching contributes to the improvement in S/N in the recording and reproduction characteristics.

Figure 10:
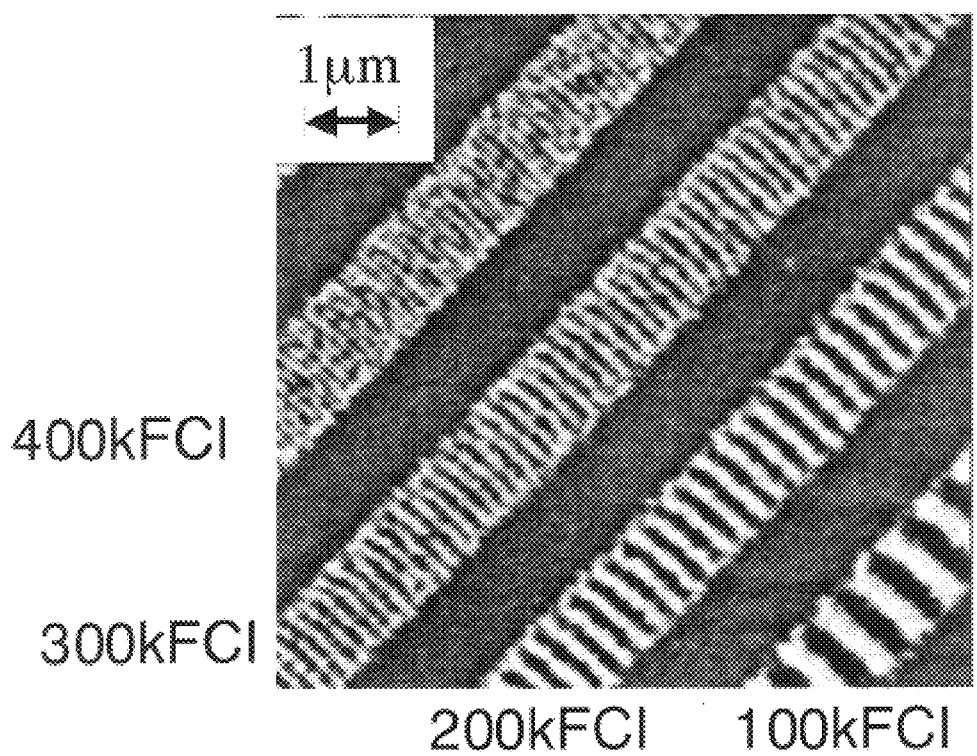
FIG. 10 shows an image observed with MFM for a repeating pattern recorded in a recording layer of a magnetic recording medium produced by plasma-etching a soft magnetic layer.

Next, the repeating pattern was recorded on the magnetic recording medium subjected to the etching treatment at linear recording densities of 100 kFCI, 200 kFCI, 300 kFCI, and 400 kFCI. The recording mark recorded in the recording layer was observed with a magnetic force microscope (MFM). FIG. 10 shows an image observed with MFM. As understood from FIG. 10, the magnetization transition area is extremely distinct even when the linear recording density is 400 kFCI.

Figure 11:
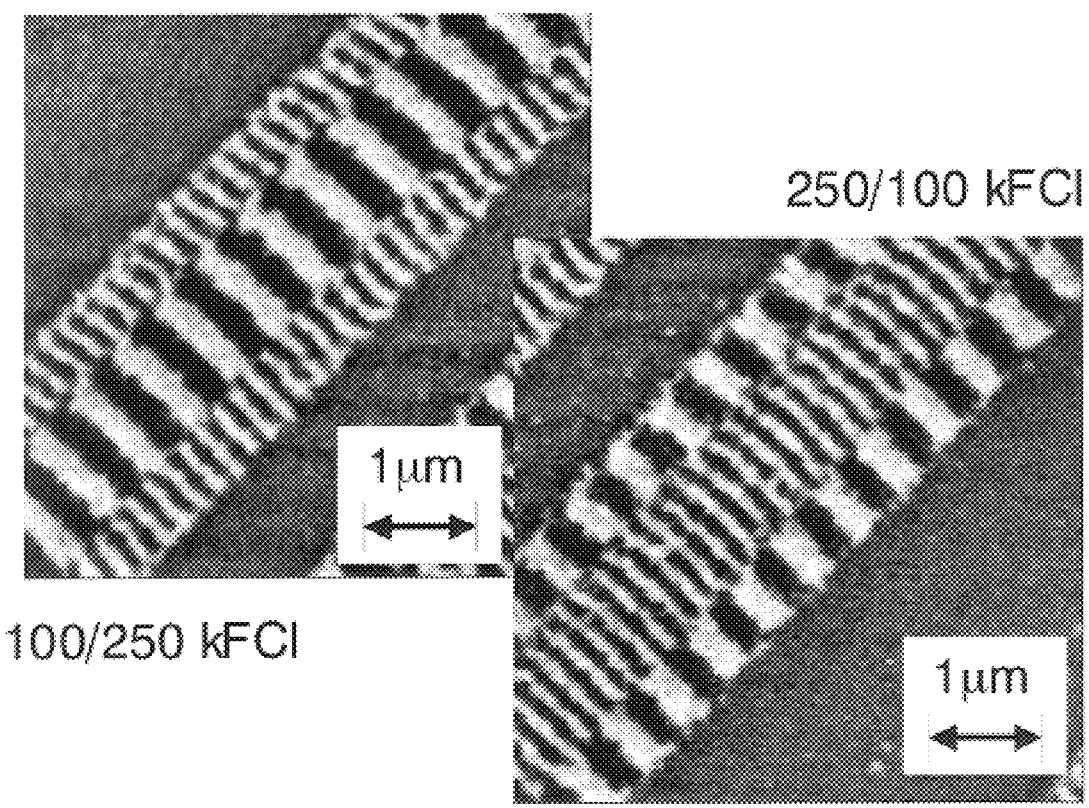
FIG. 11 shows images observed with MFM obtained when a repeating pattern was overwritten at mutually different linear recording densities in a recording layer of a magnetic recording medium produced by plasma-etching a soft magnetic layer.

Subsequently, the repeating pattern was recorded in the recording layer at a linear recording density of 250 kFCI, and then the recording head was subjected to off-track in an amount of the head width to adjoin the repeating pattern so that the repeating pattern was recorded at the same linear recording density. The repeating pattern was overwritten at a linear recording density of 100 kFCI at a substantially central position in the widthwise direction of the track between the obtained two arrays of the repeating patterns. Similarly, the repeating pattern was recorded in the recording layer at a linear recording density of 100 kFCI, and then the recording head was subjected to off-track in an amount of the head width to adjoin the repeating pattern so that the repeating pattern was recorded at the same linear recording density. The repeating pattern was overwritten at a linear recording density of 250 kFCI at a substantially central position in the widthwise direction of the track between the obtained two arrays of the repeating patterns. FIG. 11 shows images observed with MFM for the recording layers in which the repeating pattern was overwritten at the different linear recording densities on the repeating pattern. As understood from FIG. 11, the overwritten repeating pattern is very clear, and the old repeating patterns, which exist on the both side of the overwritten repeating pattern, remain without being erased. There is no so-called erased side band. As said by this fact, it is indicated that the track pitch of recorded patterns can be reduced in the magnetic recording medium according to the present invention, so that the medium is suitable for magnetic recording with extremely high track density.

According to the results described above, the recording layer, in which the boundary between the crystal grains, i.e., the crystal grain boundary is extremely distinct, can be formed on the seed layer by plasma-etching the surface of the soft magnetic layer to be flat, and forming the seed layer of Pd—SiN on the flat soft magnetic layer. The magnetic coupling force in the in-plane direction is further reduced for the crystal grains owing to the distinct crystal grain boundary as described above. Therefore, it is possible to form the minute recording bit, and it is possible to enhance the linearity of the magnetization transition area. Accordingly, it is possible to perform the high density recording, and it is possible to reproduce information recorded at a high density with low noise.

EXAMPLE 8

In Example 8, a magnetic recording medium was produced in the same manner as in Example 5 except that the plasma etching was performed with an Ar gas pressure of 0.9 Pa, a power of 400 W, and an etching time of 10 seconds as the plasma etching treatment for the surface of the soft magnetic layer. The surface roughness of the soft magnetic layer after the plasma etching was measured with AFM in the same manner as in Example 5. As a result, the surface roughness was 0.40 nm. The recording and reproduction test was performed with the spin stand in the same manner as in Example 1. As a result, S/N was increased by 0.5 dB as compared with a magnetic recording medium produced without performing the etching treatment.

EXAMPLE 9

In Example 9, a magnetic recording medium was produced in the same manner as in Example 5 except that the plasma etching was performed with an Ar gas pressure of 0.9 Pa, a power of 600 W, and an etching time of 300 seconds as the plasma etching treatment for the surface of the soft magnetic layer. The surface roughness of the soft magnetic layer after the plasma etching was measured with AFM in the same manner as in Example 5. As a result, the surface roughness was 0.20 nm. The recording and reproduction test was performed with the spin stand in the same manner as in Example 1. As a result, S/N was increased by 2.0 dB as compared with a magnetic recording medium produced without performing the etching treatment. Taking this result into consideration in combination with the results obtained in Examples 7 and 8 described above, it is understood that the flatter the surface of the soft magnetic layer is, the more improved S/N is.

EXAMPLE 10

Figure 12:
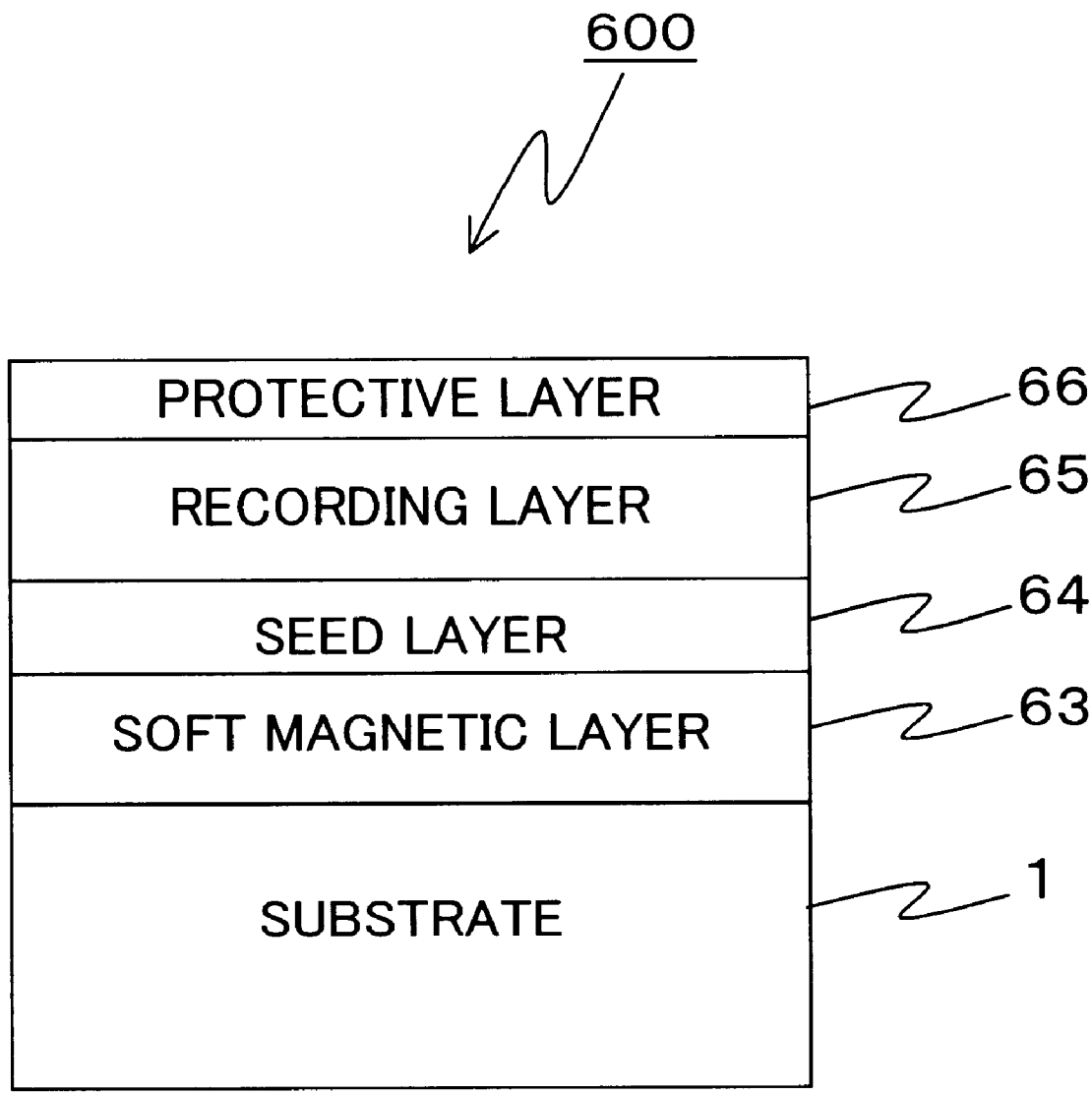
FIG. 12 schematically shows a cross-sectional structure of a magnetic disk according to the present invention produced in Example 10.

FIG. 12 shows a schematic sectional view illustrating a magnetic disk according to the present invention. The magnetic disk 600 comprises, on a substrate 1, a soft magnetic layer 63 which is formed of a soft magnetic material, a seed layer 64 which is composed of oxide of Fe, a recording layer 65 which is formed of a hard magnetic material, and a protective layer 66. The magnetic recording medium 600 of Example 10 resides in a case in which an FeTaC film was used for the soft magnetic layer 63, a Co/Pd alternately stacked film (artificial lattice film) obtained by alternately stacking Co and Pd was used for the recording layer 65, and the seed layer 64 composed of the Fe oxide was formed by means of the reactive sputtering method. The magnetic disk 600 was produced in accordance with the following method.

Formation of Soft Magnetic Layer

A glass substrate having a diameter of 2.5 inches (about 6.25 cm) was used as the substrate 1 for the magnetic disk. The FeTaC film was formed as the soft magnetic layer 63 on the glass substrate 1 by means of the magnetron sputtering method. An alloy having a composition of $Fe_{79}Ta_9C_{12}$ was used as a target. The film thickness was 400 nm. A heating treatment was applied in vacuum with a lamp to the film after the film formation. The heating temperature was 450° C. As a result of the heating treatment, Fe microcrystals were formed in the FeTaC film, and the soft magnetization characteristics appeared.

Formation of Seed Layer

Subsequently, the seed layer 64 was formed on the soft magnetic layer 63 by means of the reactive sputtering method. When the seed layer 64 was formed as the film, an Fe target was subjected to DC sputtering while introducing a mixed gas of Ar and oxygen (ratio of flow rate of oxygen with respect to Ar=20%). Thus, the Fe oxide was accumulated to give a film thickness of 5 nm.

Formation of Recording Layer

Subsequently, the Co/Pd alternate multilayered film was produced as the recording layer 65 in accordance with the DC sputtering method. At first, Pd was accumulated to have a thickness of 5 nm on the seed layer, and Co and Pd were alternately accumulated thereon. When the film of the Co/Pd alternate multilayered film was formed, Co of a thickness of 0.11 nm and Pd of a thickness of 0.76 nm were alternately stacked by opening/closing shutters for a Pd target and a Co target. The numbers of stacked layers of the Co layers and the Pd layers were twenty-six respectively. The substrate was not heated during the formation of the Co/Pd alternate multilayered film.

Formation of Protective Layer

Finally, a C (carbon) film was formed to have a film thickness of 8 nm as the protective layer 66 by means of the RF sputtering method. Thus, the magnetic disk was produced.

EXAMPLE 11

In Example 11, a magnetic disk was produced in the same manner as in Example 10 except that a seed layer was formed in accordance with the high temperature oxidation method. A method for forming the seed layer based on the high temperature oxidation method will be described below. The methods for forming the layers other than the method for forming the seed layer were the same as those used in Example 10, explanation of which will be omitted.

The soft magnetic layer composed of FeTaC was formed on the glass substrate in the same manner as in Example 10, to which the heating treatment was applied with the lamp. After the completion of the heating treatment, the product was retained as it was in vacuum for 1 minute. After that, the oxygen gas was introduced for 3 minutes at a flow rate of 200 sccm. The FeTaC film was exposed to the oxygen gas during the period in which the FeTaC film was still at high temperature brought about by the residual heat of the heat treatment as described above. Thus, the film of the Fe oxide, i.e., the seed layer was formed on the surface of the FeTaC film. The film thickness of the seed layer was 5 nm.

The recording layer and the protective layer were formed on the seed layer as described above in the same manner as in Example 10. Thus, the magnetic disk was produced.

EXAMPLE 12

In Example 12, a magnetic disk was produced in the same manner as in Example 10 except that a soft magnetic layer was formed by using a CoZrTa film. When the soft magnetic layer was formed, then the DC magnetron sputtering method was used, and an alloy having a composition of $Co_{80}Zr_{12}Ta_8$ was used for a target. The layer thickness was 400 nm. The methods for forming the layers other than the method for forming the soft magnetic layer were the same as those used in Example 10.

EXAMPLE 13

In Example 13, a magnetic disk was produced in the same manner as in Example 10 except that a Co/Pt alternate multilayered film comprising alternately stacked Co and Pt was used as a recording layer. When the Co/Pt alternate multilayered film was formed, the DC sputtering method was used. Pt was firstly accumulated on the seed layer to have a thickness of 5 nm, and Co of a thickness of 0.12 nm and Pt of a thickness of 0.80 nm were alternately stacked thereon. The numbers of both of the stacked Pt layers and the stacked Co layers were twenty-three. The substrate temperature was 250° C. during the formation of the Co/Pt alternate multilayered film. The methods for forming the layers other than the method for forming the recording layer were the same as those used in Example 10.

EXAMPLE 14

In Example 14, a magnetic disk was produced in the same manner as in Example 10 except that the film thickness of the seed layer was 30 nm.

REFERENCE EXAMPLE 1

In Reference Example 1, a magnetic disk was produced in the same manner as in Example 10 except that the film thickness of the seed layer was 40 nm.

REFERENCE EXAMPLE 2

In Reference Example 2, a magnetic disk was produced in the same manner as in Example 10 except that the film thickness of the seed layer was 50 nm.

COMPARATIVE EXAMPLE 4

A magnetic disk was produced in the same manner as in Example 10 except that no seed layer was provided.

COMPARATIVE EXAMPLE 5

A magnetic disk was produced in the same manner as in Example 12 except that no seed layer was provided.

COMPARATIVE EXAMPLE 6

A magnetic disk was produced in the same manner as in Example 13 except that no seed layer was provided.

COMPARATIVE EXAMPLE 7

A magnetic disk was produced in the same manner as in Example 10 except that no soft magnetic layer was provided.

Evaluation of Media

The recording and reproduction characteristics of the respective magnetic disks were evaluated after applying a lubricant on the protective layer of each of the magnetic disks of Examples 10 to 14, Comparative Examples 4 to 7, and Reference Examples 1 and 2. A recording and reproducing apparatus of the spin stand system was used to evaluate the recording and playback characteristics. A thin film magnetic head based on the use of a soft magnetic film having a saturation magnetic flux density of 1.6 T was used for the recording. A spin bulb type GMR magnetic head was used for the reading. The gap length of the magnetic head was 0.12 µm. The distance between the head surface and the disk surface was maintained to be 20 nm.

Results of the evaluation for the magnetic disks of Examples, Reference Examples, and Comparative Examples are shown in a table in FIG. 13. In this case, LFop/Nd represents the ratio between the playback output LFop obtained when a signal of a linear recording density of 10 kFCI is recorded and Nd as the noise obtained when recording is performed at 400 kFCI, and it is used as an index for S/N of the medium. D50 represents the linear recording density at which the reproduction output is lowered to ½ of LFop, and it is used as an index for the recording resolution.

In the case of the magnetic disks of Examples 10, 12, and 13 in which the seed layer was formed to have a film thickness of 5 nm by means of the reactive sputtering, it is appreciated that high LFop/Nd and good D50 were obtained. Also in the case of the magnetic disk of Example 11 in which the seed layer was formed by means of the high temperature oxidation method, excellent LFop/Nd and D50 were obtained. In the case of the magnetic disk of Example 14 in which the film thickness of the seed layer was 30 nm, the decrease in D50 was observed, although high LFop/Nd was obtained. On the other hand, in the case of the magnetic disks of Comparative Examples 4 to 7 in which no seed layer was provided, LFop/Nd was clearly low, although D50 was slightly high. Especially, in the case of the magnetic disk of Comparative Example 7 in which no soft magnetic layer was provided, LFop/Nd was extremely low. In the case of the magnetic disks of Reference Examples 1 and 2, D50 was slightly lowered, although LFop/Nd was good, i.e., not less than 20 dB, probably for the following reason. That is, the distance between the magnetic head and the soft magnetic layer was increased due to the thick seed layer.

The structure and the composition of the produced magnetic disks were analyzed with a high resolution transmission electron microscope (TEM) and an Auger electron spectroscopy (AES). As a result, it was confirmed that the layer composed of the Fe oxide containing major components of Fe and O was formed in a thickness of about 5 nm on the soft magnetic layer or on the glass substrate in each of the magnetic disks of Examples 10 to 13 and Comparative Example 7. Further, it was confirmed that the layer composed of the Fe oxide was formed in a film thickness of about 30 nm in the magnetic disk of Example 14.

Next, the magnetic disk of Example 11 was incorporated into the magnetic disk apparatus shown in FIG. 3 in the same manner as in Example 4 to evaluate the recording and playback characteristics.

A signal (700 kFCI) corresponding to a surface density of 40 Gb/inch$^2$ was recorded on the magnetic disk produced in Example 11 to evaluate S/N of the disk. As a result, a value of 34 dB was obtained. Further, the error rate was measured. As a result, a value of not more than $1 \times 10^{-5}$ was obtained when no signal processing was performed.

EXAMPLE 15

In Example 15, a magnetic disk was produced in the same manner as in Example 10 except that a seed layer was formed to contain Fe oxide and Fe metal. When the film of the seed layer was formed, the reactive sputtering method was used to perform DC sputtering with an Fe target while introducing oxygen gas at a flow rate ratio of 6% with respect to Ar gas. As a result of the sputtering as described above, the seed layer containing the Fe oxide and the Fe metal was formed to have a film thickness of 5 nm.

EXAMPLE 16

In Example 16, a magnetic disk was produced in the same manner as in Example 15 except that the flow rate ratio of oxygen gas with respect to Ar gas was 2.5% when a seed layer was formed by means of the reactive sputtering method.

EXAMPLE 17

A magnetic disk was produced in the same manner as in Example 15 except that a Co/Pt multilayered film obtained by alternately stacking Co and Pt was used as a recording layer. When the Co/Pt alternate multilayered film was formed, the DC sputtering method was used. At first, Pt was accumulated to have a thickness of 5 nm on the seed layer, and Co having a thickness of 0.12 nm and Pt having a thickness of 0.80 nm were alternately stacked thereon. The numbers of stacked layers of the Co layers and the Pt layers were twenty-three in both cases. The substrate temperature was 200° C. when the Co/Pt alternate multilayered film was formed.

EXAMPLE 18

In Example 18, a magnetic disk was produced in the same manner as in Example 15 except that a seed layer was formed, and then the surface of the seed layer was subjected to sputtering etching. The etching treatment for the surface of the seed layer was performed as follows. That is, the seed layer was formed by means of the same method as that used in Example 10, and then Ar gas at a flow rate to give a vacuum degree of 0.9 Pa was introduced to perform RF sputtering etching for the surface of the seed layer. The sputtering etching time was 30 seconds. After performing the sputtering etching as described above, the recording layer and the protective layer were formed in accordance with the same method as that used in Example 15 to produce the magnetic disk.

EXAMPLE 19

In Example 19, a magnetic disk was produced in the same manner as in Example 15 except that the flow rate ratio of oxygen gas with respect to Ar gas was 8% when a seed layer was formed by means of the reactive sputtering method.

EXAMPLE 20

In Example 20, a magnetic disk was produced in the same manner as in Example 15 except that the flow rate ratio of oxygen gas with respect to Ar gas was 1.5% when a seed layer was formed by means of the reactive sputtering method.

EXAMPLE 21

In Example 21, a magnetic disk was produced in the same manner as in Example 15 except that a seed layer was formed to have a film thickness of 30 nm.

EXAMPLE 22

In Example 22, a magnetic disk was produced in the same manner as in Example 17 except that the flow rate ratio of oxygen gas with respect to Ar gas was 8% when a seed layer was formed by means of the reactive sputtering method.

EXAMPLE 23

In Example 23, a magnetic disk was produced in the same manner as in Example 17 except that the flow rate ratio of oxygen gas with respect to Ar gas was 1.5% when a seed layer was formed by means of the reactive sputtering method.

A lubricant was applied onto the protective layer of each of the magnetic disks produced as described above, and then the recording and playback characteristics of the respective magnetic disks were evaluated by using the same method as that used in "Evaluation of Medium" described above. FIG. 14 shows the recording and playback characteristics of the respective magnetic disks of Examples 15 to 23.

FIG. 14 also shows the ratio ($Fe_{Met}/Fe_{Oxi}$) between the number of atoms of Fe existing as oxide in the seed layer, $Fe_{Oxi}$, and the number of atoms of Fe existing as metal, $Fe_{Met}$. The atom number ratio ($Fe_{Met}/Fe_{Oxi}$) was determined as follows. That is, the chemical state of the seed layer of the produced magnetic disk was analyzed by means of the depth profile analysis based on the use of the X-ray photoelectron spectroscopy (XPS). The Fe spectrum of the seed layer composed of Fe oxide and Fe metal was separated into two types of peaks, i.e., the peak originating from oxide and the peak originating from metal.

In the case of the magnetic disks of Examples 15 to 19, 22, and 23, high LFop/Nd of 21.5 to 27.1 dB was obtained. Especially, it is appreciated that the magnetic disks of Examples 15 to 19 were excellent in both of LFop/Nd and D50. The value of $Fe_{Met}/Fe_{Oxi}$ of each of the magnetic disks of Examples 15 to 19 was within a range of $0.02<Fe_{Met}/Fe_{Oxi}<0.2$. In the case of the magnetic disk of Example 18 in which the surface of the seed layer was subjected to the sputtering etching, the value of LFop/Nd was extremely high, i.e., 27.1. In the case of the magnetic disks of Examples 20 and 24 in which the oxygen gas was 1.5% when the seed layer was formed, LFop/Nd was low, i.e., 15.7 dB and 14.8 dB respectively. The values of $Fe_{Met}/Fe_{Oxi}$ of the seed layers of the magnetic disks of Examples 20 and 24 were 0.22 and 0.21 respectively. That is, in the case of the magnetic disks of Examples 20 and 24, the Fe metal was contained in a large amount in the seed layer as compared with the magnetic disks of other Examples. According to this fact, the following speculation is affirmed. That is, the platinum group element for constructing the recording layer increasingly adsorbed to the Fe metal, and fine magnetic grains were hardly formed, when the recording layer was formed on the seed layer, because the Fe metal was contained in a relatively large amount in the seed layer. In the case of the magnetic disk of Example 22 in which the thickness of the seed layer was 30 nm, D50 was low, i.e., 144 kFCI, probably for the following reason. That is, the spacing distance between the magnetic head and the soft magnetic layer was large due to the thick film thickness of the seed layer. As a result, the magnetic field from the magnetic head was not applied to the recording layer at a sufficient magnetic field intensity.

Next, the magnetic disk of Example 15 was incorporated into the magnetic disk apparatus shown in FIG. 3 in the same manner as in Example 4 to evaluate the recording and reproduction characteristics. A signal (700 kFCI) corresponding to a surface density of 40 Gb/inch$^2$ was recorded on the magnetic disk of Example 15 to evaluate S/N of the magnetic disk. As a result, a value of 36 dB was obtained. Further, the error rate was measured. As a result, a value of not more than $1\times10^{-5}$ was obtained when no signal processing was performed.

EXAMPLE 24

Figure 15:
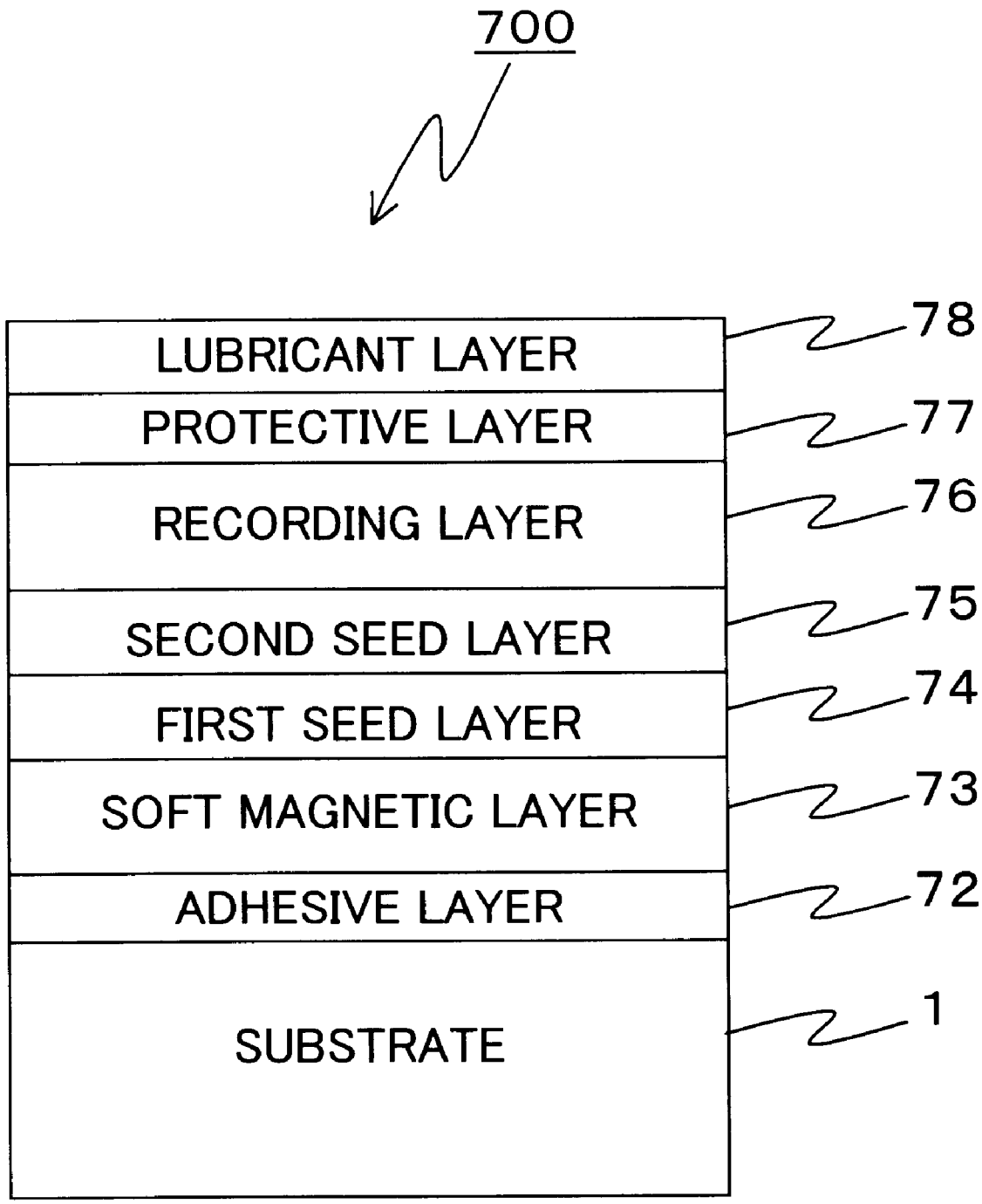
FIG. 15 shows a schematic sectional view illustrating a magnetic recording medium according to the present invention produced in Example 24.

FIG. 15 shows a schematic sectional view illustrating a magnetic recording medium of Example 24. The magnetic recording medium 700 comprises, on a substrate 1, a soft magnetic layer 73 formed of a soft magnetic material, a first seed layer 74 composed of oxide of Fe, a second seed layer 75 composed of Pd—SiN, a recording layer 76 formed of a hard magnetic material, and a protective layer 77. A method for producing the magnetic recording medium 700 will be explained below.

Preparation of Substrate

At first, the glass substrate 1 having a diameter of 65 mm was prepared. A film of Ti having a thickness of 5 nm was formed as an adhesive layer 72 on the glass substrate 1 by using a continuous sputtering apparatus.

Formation of Soft Magnetic Layer

Subsequently, a film of FeTaC was formed as the soft magnetic layer 73 on the adhesive layer 72 by means of the DC magnetron sputtering method. An alloy having a composition of $Fe_{79}Ta_9C_{12}$ was used for a target. The film thickness was 400 nm. Further, the formed film of $Fe_{79}Ta_9C_{12}$ was heated for 30 seconds at a temperature of 450° C. in vacuum with a carbon heater, and then the film was gradually cooled. Thus, the soft magnetic layer 73 containing microcrystals of Fe was formed.

Formation of First Seed Layer

Subsequently, the first seed layer 74 was formed on the soft magnetic layer 73 by means of the reactive sputtering method. When the film of the first seed layer 74 was formed, an Fe target was subjected to DC sputtering, while introducing a mixed gas of Ar and oxygen (flow rate ratio of oxygen with respect to Ar=20%). Thus, Fe oxide was accumulated to give a film thickness of 5 nm.

Formation of Second Seed Layer

Subsequently, the substrate 1 was transferred to a chamber of an alternate sputtering apparatus, and a film of the second seed layer 75 was formed on the first seed layer 74. When the film of the second seed layer 75 was formed, then a Pd target was subjected to DC sputtering, and an SiN target was subjected to RF sputtering, while introducing argon gas into the chamber. Accordingly, the second seed layer 75, which was composed of 73 atomic % of Pd, 26 atomic % of Si, and 1 atomic % of N, was formed to have a film thickness of 5 nm on the first seed layer 74.

Formation of Recording Layer

Subsequently, a Co/Pd alternate multilayered film was prepared as the recording layer 76 by means of the DC sputtering method. When the Co/Pd alternate multilayered film was formed, Co having a thickness of 0.12 nm and Pd having a thickness of 0.85 nm were alternately stacked by opening/closing shutters for a Pd target and a Co target. The numbers of stacked layers of the Co layers and the Pd layers were twenty-six respectively.

Formation of Protective Layer and Lubricant Layer

Subsequently, the protective layer 77 composed of amorphous carbon was formed to have a film thickness of 3 nm on the recording layer 76 by means of the plasma CVD method. After the protective layer 77 was formed, the substrate was taken out of the film-forming apparatus. Finally, a perfluoropolyether-based lubricant was applied to give a thickness of 1 nm on the protective layer 77 so that the lubricant layer 78 was formed.

Thus, the magnetic recording medium 700 having the stacked structure shown in FIG. 15 was produced.

The magnetic recording medium 700 produced as described above was installed to the magnetic storage apparatus shown in FIG. 3 in the same manner as in Example 4. The magnetic storage apparatus was driven to evaluate the recording and playback characteristics under the same condition as that used in Example 4. As a result, 24.5 dB was obtained as total S/N. Further, the recording and playback were successfully performed at a recording density of 150 gigabits/square inch of the areal recording density. The following head seek test was performed. The magnetic head was subjected to the seek one hundred thousand times from the inner circumference to the outer circumference over the magnetic recording medium. The bit error of the magnetic recording medium was measured after the head seek test as described above. As a result, the bit error number was not more than 10 bits/surface. An average failure interval of three hundred thousand hours was successfully achieved.

Subsequently, the electromagnetic conversion characteristics were measured for the magnetic recording medium 700 by using the spin stand recording and playback test machine under the same condition as that used in the measurement of the electromagnetic conversion characteristics described above. Results of the measurement are shown in Table 3 below. In Table 3, S/Nd represents S/N at 500 kFCI, and Re represents the output resolution divided by the isolated read signal output. The thermal delay ratio represents the ratio of the change of the read signal amplitude with respect to the time obtained when a signal recorded at a linear recording density of 100 kFCI was reproduced in an environment at 24° C.

TABLE 3

|  | S/Nd (dB) | Re (%) | Thermal decay ratio (%/decade) |
|---|---|---|---|
| Example 24 | 18.0 | 20.5 | 0 |

As understood from Table 3, good S/N was obtained in Example 24. Further, the resolution was also extremely high, i.e., not less than 18%. According to this fact, it is appreciated that the transition noise is reduced in the high region, and both of the high resolution and high S/N are satisfied in the magnetic disk of Example 24.

The cross-sectional structure of the recording layer of the magnetic disk was observed with a high resolution transmission electron microscope. As a result, the recording layer had a structure as shown in FIG. 2 in the same manner as the magnetic recording media of Examples 1 to 3 described above. The diameter d of the cross section perpendicular to the rotation axis of the columnar crystal grain as shown in FIG. 2 was about 8 nm, and the difference h between the uppermost portion A and the lowermost portion B of the hemisphere of the surface of the crystal grain was 2 nm. It is considered that the magnetic coupling force in the in-plane direction is reduced, the fine recording bit is stable, and the linearity of the magnetization transition area is good, because the recording layer of the magnetic recording medium of Example 24 is composed of the columnar crystal grains as described above.

As appreciated from the result of the thermal decay ratio in Table 3 described above, no thermal decay was observed for the magnetic recording medium of Example 24. It is considered that the fact that the thermal decay was not observed for the magnetic recording medium of Example 24 results from the fact that the magnetization transition area of the recording layer is distinct, and the linearity is enhanced. The error rate was measured in an on-track manner at 1000 kBPI. As a result, the error rate was not more than $1 \times 10^{-5}$ for the magnetic recording medium of Example 24 in any case.

EXAMPLE 25

In Example 25, magnetic recording media having the same stacked structure as that of the magnetic recording medium shown in FIG. 15 were produced. The seed layer containing the Fe oxide and the Fe metal used in Example 18 was used for the first seed layer 74, and the seed layer composed of PdSiN used in Example 1 was used for the second seed layer 75. The soft magnetic layer 73 and the first seed layer 74 on the substrate 1 were formed by using the same method as that used in Example 18. The second seed layer 75, the recording layer 76, the protective layer 77, and the lubricant layer 78 were formed by using the same method as that used in Example 1. In Example 25, seven types of magnetic recording media (Samples 15 to 21) were produced by varying the second seed layer to have a variety of compositions. The compositions of the second seed layers of the respective magnetic recording media are shown in Table 4 below. S/Nd, Re, and the thermal demagnetization ratio were measured for the respective produced magnetic recording media by using the spin stand recording and reproduction test machine in the same manner as in the measurement of the electromagnetic conversion characteristics described above. Results of the measurement are shown in Table 4 below.

TABLE 4

|  | Composition of Second seed layer | | | | | Thermal |
|---|---|---|---|---|---|---|
|  | Pd (at %) | Si (at %) | N (at %) | S/Nd (dB) | Re (%) | decay ratio (%/decade) |
| Sample 15 | 75 | 20 | 5 | 15.5 | 21.5 | 0 |
| Sample 16 | 70 | 20 | 10 | 15.5 | 21.1 | 0 |
| Sample 17 | 70 | 29.5 | 0.5 | 15.4 | 21.0 | 0 |
| Sample 18 | 79 | 20 | 1 | 15.0 | 20.0 | 0 |
| Sample 19 | 80 | 10 | 10 | 14.8 | 19.5 | 0 |
| Sample 20 | 60 | 30 | 10 | 14.7 | 19.2 | 0 |
| Sample 21 | 55 | 35 | 10 | 14.7 | 19.3 | 0 |

As appreciated from the table shown above, good S/N of not less than 14.7 dB was obtained for all of the samples. Further, Re was also extremely high, i.e., not less than 19%. That is, it is appreciated that the high resolution and high S/N are realized in the magnetic recording medium of Example 25. It is also appreciated that the magnetic recording medium is excellent in thermal stability, because no thermal decay was observed.

The magnetic recording medium of the present invention has been specifically explained. However, the present invention is not limited thereto, which may include a variety of modified embodiments and improved embodiments.

In the magnetic recording medium according to the first aspect of the present invention, the first seed layer containing the Fe oxide is used as the underlying base for the second seed layer containing one of Pd and Pt, Si, and N. Therefore, the dispersion of Pd or Pt in SiN in the second seed layer is facilitated. Further, the recording layer is provided on the second seed layer in which the dispersion of Pd or Pt is facilitated. Therefore, the fine crystal grains having the distinct grain boundary are formed in the recording layer. Accordingly, the magnetic coupling force in the in-plane direction of the recording layer is reduced. Therefore, even when the linear recording density is increased, information can be reproduced at low noise.

In the magnetic recording medium according to the second aspect of the present invention, the seed layer containing one of Pd and Pt, Si, and N is used as the underlying base for the recording layer having the artificial lattice structure. Therefore, it is possible to reduce the magnetic coupling force in the in-plane direction of the recording layer. Accordingly, the disturbance in the magnetization transition area of the recording layer is reduced. Therefore, even when the linear recording density is increased, information can be reproduced at low noise. Further, the magnetic recording medium has high thermal stability, because the artificial lattice film having high magnetic anisotropy is used as the recording layer.

In the magnetic recording medium according to the third aspect of the present invention, the seed layer containing the major component of the Fe oxide is provided between the soft magnetic layer composed of the soft magnetic material and the recording layer composed of the hard magnetic material. Therefore, for example, even when the Co/Pt artificial lattice film having high magnetic anisotropy is used as the recording layer, then it is possible to make the magnetic grains of the recording layer to be fine and minute, and it is possible to form the minute magnetic domains in the recording layer. Accordingly, the medium noise is reduced, and information can be reproduced at high S/N. The recording layer can be formed by using the artificial lattice film having high magnetic anisotropy. Therefore, the magnetic recording medium has high resistance to the thermal fluctuation, and information can be recorded at a high density.

According to the production method of the present invention, it is possible to produce the magnetic recording medium provided with the recording layer in which the magnetic exchange coupling force in the in-plane direction is reduced. Therefore, it is possible to provide the magnetic recording medium which makes it possible to reproduce, with low noise, information recorded at a high density.

The magnetic storage apparatus of the present invention is provided with the magnetic recording medium according to any one of the first to third aspects of the present invention. Therefore, even when information is recorded at a high areal recording density of 150 gigabits/square inch (about 23.25 gigabits/square centimeter), the information can be reproduced at high SIN. Further, the magnetic storage apparatus has the characteristics of high resistance to thermal fluctuation.

What is claimed is:

1. A magnetic recording medium comprising:
   a substrate;
   a soft magnetic layer;
   a first seed layer containing oxide of Fe;
   a second seed layer containing Si, N, and one of Pd and Pt; and
   a recording layer.

2. The magnetic recording medium according to claim 1, wherein the recording layer is an artificial lattice film formed by alternately stacking a platinum group metal layer composed of at least one of Pt and Pd, and a Co layer composed of Co.

3. The magnetic recording medium according to claim 1, wherein the first seed layer contains Fe existing as metal.

4. The magnetic recording medium according to claim 1, wherein a content of Si in the second seed layer is within a range of 10 atomic % to 35 atomic %, and a content of N is within a range of 0.1 atomic % to 10 atomic %.

5. The magnetic recording medium according to claim 4, wherein the second seed layer further contains Co within a range of 1 atomic % to 10 atomic %.

6. The magnetic recording medium according to claim 1, wherein each of the first seed layer and the second seed layer has a film thickness within a range of 1 nm to 30 nm.

7. The magnetic recording medium according to claim 1, wherein the soft magnetic layer has a structure in which nitride or carbide of at least one element selected from the group consisting of Ta, Nb, and Zr is dispersed in Fe.

8. The magnetic recording medium according to claim 1, wherein the soft magnetic layer is formed of an amorphous alloy principally containing Co-Zr and further containing at least one element selected from the group consisting of Ta, Nb, and Ti.

9. The magnetic recording medium according to claim 1, wherein the recording layer is composed of aggregates of crystal grains, each of the crystal grains extends in a columnar configuration in a direction perpendicular to a surface of the substrate, a tip of each of the crystal grains is bulged on a surface of the recording layer, a diameter in a cross section perpendicular to a rotation axis of the columnar crystal grain is within a range of 2 nm to 15 nm, and a height of the bulge of the crystal grain is within a range of 1 nm to 10 nm.

10. A method for producing a magnetic recording medium, comprising:
    preparing a substrate;
    forming a soft magnetic layer on the substrate;
    forming, on the soft magnetic layer, a first seed layer containing oxide of Fe;
    forming, on the first seed layer, a second seed layer containing Si, N, and one of Pd and Pt; and
    forming, on the second seed layer, a recording layer having an artificial lattice structure.

11. The method for producing the magnetic recording medium according to claim 10, wherein the first seed layer is formed by performing reactive sputtering for a target containing Fe with a sputtering gas containing oxygen.

12. The method for producing the magnetic recording medium according to claim 11, wherein the first seed layer is allowed to contain the Fe existing as metal by controlling an amount of oxygen in the sputtering gas.

13. The method for producing the magnetic recording medium according to claim 12, further comprising sputtering-etching a surface of the first seed layer.

14. A magnetic storage apparatus comprising:
    the magnetic recording medium as defined in claim 1;
    a magnetic head which is used to record or reproduce information; and
    a driving unit which drives the magnetic recording medium with respect to the magnetic head.

* * * * *